(12) United States Patent
Mogilevsky et al.

(10) Patent No.: US 7,051,276 B1
(45) Date of Patent: May 23, 2006

(54) VIEW TEMPLATES FOR HTML SOURCE DOCUMENTS

(75) Inventors: Alex Mogilevsky, Bellevue, WA (US); Carl A. Edlund, Bellevue, WA (US); Oleg V. Ovetchkine, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1270 days.

(21) Appl. No.: 09/671,815

(22) Filed: Sep. 27, 2000

(51) Int. Cl.
*G06F 17/21* (2006.01)

(52) U.S. Cl. ............ 715/517; 715/520; 715/521; 715/525; 715/513

(58) Field of Classification Search ........ 715/517, 715/520, 521, 518, 522, 525, 513, 501.1
See application file for complete search history.

(56) References Cited

U.S. PATENT DOCUMENTS

| | | | | |
|---|---|---|---|---|
| 4,723,209 A | * | 2/1988 | Hernandez et al. | 715/521 |
| 5,214,755 A | * | 5/1993 | Mason | 715/521 |
| 5,845,303 A | * | 12/1998 | Templeman | 715/517 |
| 5,860,073 A | * | 1/1999 | Ferrel et al. | 715/522 |
| 5,900,002 A | * | 5/1999 | Bottomly | 715/520 |
| 5,907,837 A | | 5/1999 | Ferrel et al. | |
| 5,956,738 A | * | 9/1999 | Shirakawa | 715/517 |
| 6,023,714 A | | 2/2000 | Hill et al. | |
| 6,061,695 A | | 5/2000 | Slivka et al. | |
| 2004/0117732 A1 | * | 6/2004 | McNeill et al. | 715/513 |
| 2004/0205602 A1 | * | 10/2004 | Croeni | 715/517 |
| 2005/0193334 A1 | * | 9/2005 | Ohashi et al. | 715/517 |

OTHER PUBLICATIONS

W3C, "Positioning HTML Elements with Cascading Style Sheets", Aug. 19, 1997, pp. 1-14, http://www.w3.org/TR/WD-positioning-19970819.*

W3C, "Frame-based layout via Style Sheets", Jun. 8, 1996, pp. 1-9, http://www.w3.org/TR/NOTE-layout.*

(Continued)

*Primary Examiner*—Stephen Hong
*Assistant Examiner*—Adam L Basehoar
(74) *Attorney, Agent, or Firm*—Klarquist Sparkman LLP

(57) ABSTRACT

A View Template allows a template author to create an attractive HTML view template, and flow an arbitrary HTML content document into a series of containers defined in the view template. A content document author creates a standard HTML markup language document that can be displayed in a browser in the bottom-less page model. A view template author designs an HTML view template document that changes how that content document is displayed in the browser or printed. The HTML content document is "flowed" into areas defined by the HTML view template document. The HTML view template document describes where to flow the HTML content document onto the display or printer. There is an object model (OM) that supports the series of containers holding the content document. Each container in the series has a layout that defines the size, location, and ordering for the content document to flow through while in that container. The order of containers that the content document flows through is kept in a view chain. The view chain also maintains a break table with information about the content document at each of the container boundaries.

22 Claims, 13 Drawing Sheets

OTHER PUBLICATIONS

Nesbitt, Scott, "Accessible HTML Templates" from: http://www.pathcom.com/~kujira/template.htm, 87 pages, Oct. 1999.

Shushan, R. and Wright, D., "Desktop Publishing Guide", Chapter 3, pp. 42-111 and Hands-On Project 3, pp. 242-285, Microsoft Press 1989.

Meyer, J., "Xerox Ventura Publisher Reference Guide", Chapter 6, "Putting it Together", pp. 6-1-6-49, Ventura Software Inc., 1986, 1987, 1988.

Sosinski, B., Benz, C., McCarter, J., "Microsoft Publisher 97 for Dummies", Chapter 3, pp. 33-62, Chapter 4, pp. 65-94, Chapter 5, pp. 95-126, Chapter 6, pp. 129-157, Chapter 11, pp. 261-275, and Chapter13, pp. 299-310, 1997.

Fischer Lent, A., "The Ultimate Desktop Publishing Starter Kit", Chapter 5, pp. 77-92, Chapters 14-15, pp. 157-177, Library of Congress Cataloging-in-Publication Data, 1995.

* cited by examiner

FIG. 4

```
<HTML XMLNS:IE>
<HEAD>
<?import namespace="ie" implementation="#default">
<TITLE>PPV Percentage and sized elements.</TITLE>
<STYLE>
.mRect
{
    margin: 4px;
    border: 1px dotted red;
    position: absolute;
    width: 300px;
    height:215px;
}
</STYLE>
</HEAD>
<BODY snapshot="foo">

<h1>PPV Percentage and sized elements.</h1>

<IE:LayoutRect class=mRect
    contentSrc='ppv05_i.htm'
    id=mRect0 nextRect=mRect1
    style="top:100px; left:10px;"
/>
<br>
<IE:LayoutRect class=mRect
    id=mRect1 nextRect=mRect2
    style="top:325 ; left:10px;"
/>
<br>
<IE:LayoutRect class=mRect
    id=mRect2 nextRect=mRect3
    style="top:100px; left:320px;"
/>
<br>
<IE:LayoutRect class=mRect
    id=mRect3 nextRect=mRect4
    style="top:325px; left:320px;"
/>
<br>
<IE:LayoutRect class=mRect
    id=mRect4 nextRect=mRect5
    style="top:100px; left:630px;"
/>
<br>
<IE:LayoutRect class=mRect
    id=mRect5
    style="top:325px; left:630px;"
/>
<br>
</BODY>
</HTML>
```

FIG. 6

```
<html>
<head>
<title>PPV absolute positioned elements.</title>
<style>
<!--
body    { font: 9pt verdana, arial; color: #000000; background-color: #dfdfdf }
h3      { font: bold 10pt verdana, arial; color: #003366; text-align: left; margin: 5px }
p       { font: 9pt verdana, arial; color: #000000; margin: 10px; padding: 3px }
div     { font: bold 12pt verdana, arial; color: #003366; padding: 0px }
span    { font: bold 12pt verdana, arial; color: #003366; padding: 0px }
-->
</style>
</head>
<body>

<hr width=25%>

<h3>Nice, Nice, Very Nice 2</h3>

<div style="height: 200%; background-color: #ffefef">
<h3>div 200% height</h3>
    <p>"If you find your life tangled up with somebody else's
    life for no very logical reasons," writes Bokonon, "that
    person may be a member of your <i>karass</i>." </p>
    <p>At another point in The Books of Bokonon he tells us,
    "Man created the checkerboard; God created the karass."
    that he means that a karass ignores national, institutional,
    occupational, familial, and class boundaries. </p>
    <p>It is as free-form as an amoeba.</p>
    <p>In his "Fifty-third Calypso," Bokonon invites us to sing
    along with him: </p>
</div>

<hr width=25%>

<center>

<span style="height: 215px; background-color: #efffff">
<h3>span 215px height</h3>
    <p><i>
    Oh, a sleeping drunkard <br>
    Up in Central Park, <br>
    And a lion-hunter <br>
    In the jungle dark, <br>
    And Chinese dentist, <br>
    And a. British queen - <br>
    All fit together <br>
    In the same machine. <br>
    Nice, nice, very nice; <br>
    Nice, nice, very nice; <br>
    Nice, nice, very nice - <br>
    So many different people <br>
```

```
In the same device. <br>
    </i></p>
</span>

</center>

<hr width=25%>

<div style="height: 50%; background-color: #ffefff">
<h3>div 50% height but with text overflow</h3>
    <p>
    line 00<br>
    line 01<br>
    line 02<br>
    line 03<br>
    line 04<br>
    line 05<br>
    line 06<br>
    line 07<br>
    line 08<br>
    line 09<br>
    </p>
</div>

<hr width=25%>

<div style="height: 15px; background-color: #efefff">
<h3>div 15px height but with text overflow</h3>
    <p>
    line 00<br>
    line 01<br>
    line 02<br>
    line 03<br>
    <font size=+5>
    line 04<br>
    </font>
    line 05<br>
    line 06<br>
    line 07<br>
    line 08<br>
    line 09<br>
    </p>
</div>
<hr width=25%>

</body>
</html>
```

807

```
<IE:LayoutRect class=mRect          801
    contentSrc='URL'
    id=mRect0 nextRect=mRect1
    style="top:100px; left:10px;"
/>

<IE:LayoutRect class=mRect
    id=mRect1
    style="top:325  ; left:10px;"
/>
```
802

801

| CLayoutRectRegistry | |
|---|---|
| Unconnected Rect | ID expected |
| ( mRect0 | mRect1 ) |

904 → Layer 1: In-Flow Content Element CLayout Breaks

902 — Dimension 2 →

| Content Elements →<br>Linked ↓ Contexts | Body Element | Div 1 | Div 2 | ... | Span 1 |
|---|---|---|---|---|---|
| CLayoutContext context = 1 | Break | Break | | ... | |
| CLayoutContext context = 2  920 | Break 916 | Break 917 | Break 918 | ... | Break 919 |
| CLayoutContext context = 3 | Break | | Break | ... | |
| ⋮ | ⋮ | ⋮ | ⋮ | ⋯ | ⋮ |
| CLayoutContext context = n | Break | | | ... | |

900 — Dimension 1

922

905 → Layer 2: Positioned "Display" Content Element CLayout Breaks

903 — Dimension 2 →

| Content Elements →<br>Linked ↓ Contexts | Stitched Offset | Image | Div | ... | |
|---|---|---|---|---|---|
| CLayoutContext context = 1 | ● (y) | Break | | ... | |
| CLayoutContext context = 2 | ● (y) —921 | | | ... | |
| CLayoutContext context = 3 | ● (y) | | Break | ... | |
| ⋮ | ⋮ | ⋮ | ⋮ | ⋯ | ⋮ |
| CLayoutContext context = n | ● (y) | | | ... | |

901 — Dimension 1

FIG. 12
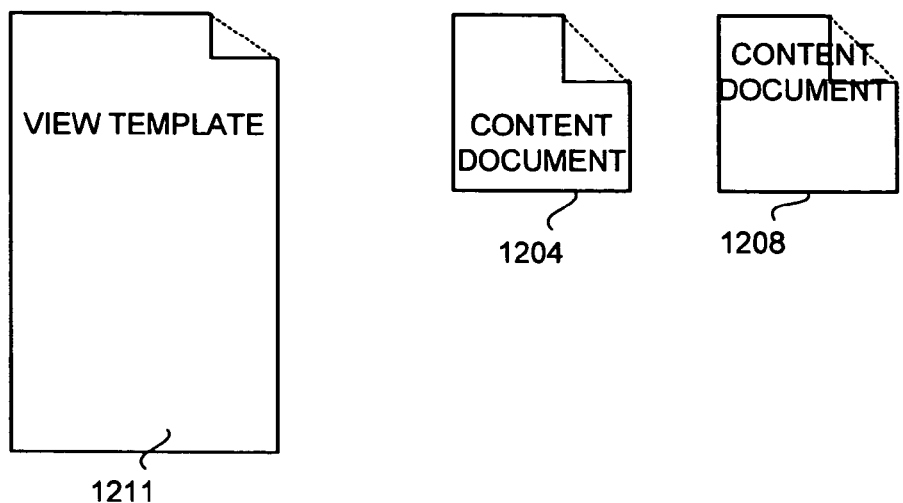
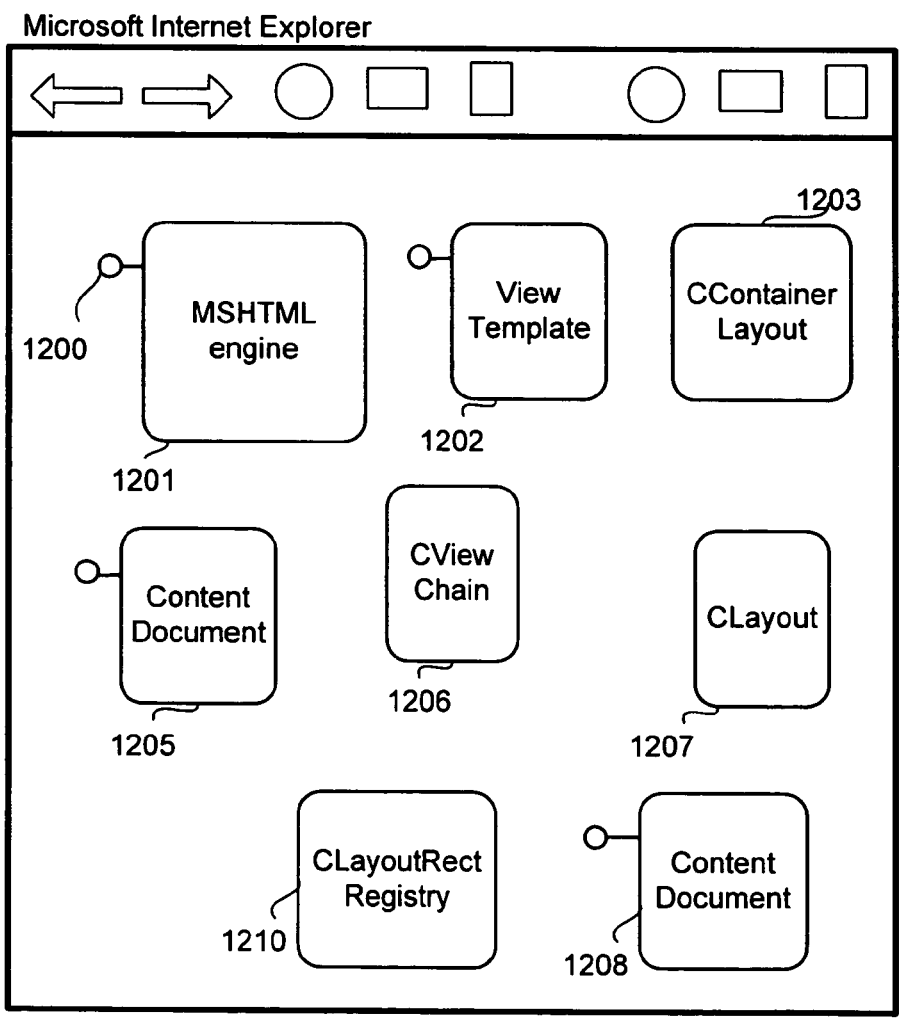

VIEW TEMPLATES FOR HTML SOURCE DOCUMENTS

TECHNICAL FIELD

The present invention relates to defining a layout of elements in an electronic document, particularly with respect to documents represented in a mark-up language.

BACKGROUND AND SUMMARY

In order to make a document available to the largest number of users, an author may create a document in a textual mark-up language such as Hypertext Markup Language ("HTML"). Textual mark-up languages can be displayed in Internet browsers such as the Microsoft Internet Explorer.

A textual mark-up language document contains both the document content (text, graphics, etc.) and the syntax that advises the browser how to display the document content. When a browser receives a textual mark-up language document, it displays the content within the browser view on the computer screen.

The syntax of a textual mark-up language includes mark-up tags that instruct the browser how to display elements of the content document within the browser view. For example, the author may request certain portions of the document to be underlined, italicized, or placed in a table. The actual way these requests are processed at the client browser varies depending on the browser implementation. The tags do not give direct control to the author, however the tags represent a standard that browsers generally attempt to honor.

A textual mark-up document author can obtain increased control over how content elements are displayed by using a style sheet. Cascading Style Sheets (CSS) is a specification circulated by the World Wide Web Consortium (W3C) that allows authors of HTML content documents to attach style sheets to HTML documents. A style sheet contains instructions defining how tag elements should appear. The style sheet may be embedded in the HTML document or linked to the HTML document.

Classically, HTML documents are based on a model of a 'bottomless-page' in which the content flows continuously without page-breaks. In the past, several methods have been employed to print HTML documents. For example, the prior version of Microsoft Internet Explorer generally employed opportunistic breaking.

Opportunistic breaking for printing involves simply measuring vertical space until one page has been completed and then sending that page off to the printer. The method takes a snap shot of where the last line ended, and starts the next page on the next line. Text is broken between lines, but elements with a hierarchical structure (like tables), may be clipped in the middle of the structure (e.g., in a cell), and started again on the next page from where it left off. There is no widow or orphan control that keeps two or three lines together by pushing them to the next page. The method continues to layout content until a vertical height equal to a page is reached. The method then breaks the layout, sends the first measured page to the printer, and starts laying out and measuring the next page.

The present invention allows the layout of an electronic source document to be defined through use of view templates. View templates in the illustrated embodiment allow a template author control over how content is rendered on the display and printed. View templates allow the use of pagination algorithms outside of the strict printing scenario and allow the template author greater control over content appearance on the display and on paged media. This embodiment allows a web host to create an attractive view template, and flow an arbitrary HTML content document into the rectangular areas defined by the view template. One embodiment of the invention illustrated herein allows only the web host to design and specify view templates. But this illustrated architecture easily allows a non-Web host entity to author the HTML view template.

For the purposes of illustration, the following discussion draws a distinction between content document authorship and view template authorship. A content document author is simply someone who creates a content document using a standard HTML markup language and available associated tools to define generally how it is displayed in any browser.

According to the illustrated embodiment of the invention, a new kind of HTML authorship is introduced—view template authorship. Now, a view template author designs an HTML view template document that takes the bottomless-page HTML content document and places it in a series of defined containers within the browser display, printer or other output device. The HTML content document is "flowed" into areas defined by the illustrated HTML view template document. The HTML view template document tells where to flow the HTML content document onto the display or printer. The HTML view template document identifies the HTML content document to be flowed and defines the series of rectangular areas that will hold the HTML content document.

Printing has been the flagship benefit since the illustrated embodiment provides a framework for pagination, but the significance of the invention is much broader. The illustrated embodiment supports output containing multiple stories flowing simultaneously across several pages, graphics interwoven with text, multiple columns, or almost whatever a template author can imagine. Further, once a view template design is complete, it can be reused as a template for other HTML content documents.

In the illustrated View Template, an object model (OM) is invoked by an HTML engine when a defined behavioral tag ("<LayoutRect>") is encountered in the HTML view template script. In such an embodiment, the view template as supported by the OM represents an architecture that takes an arbitrary HTML content document that could have been displayed in a browser as written in the bottomless page model, and forces it into a series of containers that are defined in the view template by the view template author. This forced view of the content document allows changing the content document from the classic bottomless format into a page-based view.

One potential embodiment sizes the series of containers to a sheet of paper and generates a paginated view of the source document. Another embodiment sizes the series of containers to be half the width of a sheet of paper resulting in double column pagination. However, the containers can be sized and placed in almost any configuration offering an enormous level of creativity for HTML view template authorship.

Between these series of containers containing the content document, an embodiment could contain other HTML content elements defined directly within the View Template itself and/or multiple other series of containers containing other defined HTML content documents. In such an embodiment, content elements defined within the View Template itself could be flowed into the areas between the defined container areas.

Another embodiment could have multiple series of containers, each such series containing a different HTML content document source. In such an embodiment, these multiple series could be displayed side by side, intermittently, or in any defined series of rectangle areas and in any defined order. Finally, since the mark-up language is the same in the content document and the view template document, it is possible to nest layout rectangles within layout rectangles (e.g., use layout rectangles in the content document).

The series of containers in the illustrated embodiment of the View Template, and the structures that support them, are the heart of the View Template OM. In the illustrated embodiment, each container in the series has a layout that defines the size, location, and ordering for the content document to flow through while in that container. The order of containers that the content document flows through is kept in a view chain.

In this illustrated example, a view chain also maintains a break table with information about the content document at each of the container boundaries. When the content document fills one container and the next container designated in the view template is encountered for that content document, that next container accesses the break table to determine where to start to continue to flow the content document. In this embodiment, the container and the associated break information are tied to the element objects in the content document through a container layout context identifier, and it is this layout context identifier that defines the layout process for the content document. Each of these objects will be addressed in detail in the following sections.

BRIEF DESCRIPTION OF THE DRAWINGS

FIG. 4 is a listing of a mark-up language view template.

FIGS. 6–7 is a listing of the mark-up language content document.

FIG. 9 is a graphical representation of a three dimensional break table array.

FIG. 12 is a block diagram of the objects in the object model.

DETAILED DESCRIPTION

Before the Invention

Before discussing a detailed embodiment of the invention, we briefly address how the normal HTML layout process works in the Microsoft HTML mark-up language engine (MSHTML engine).

Figure 1:
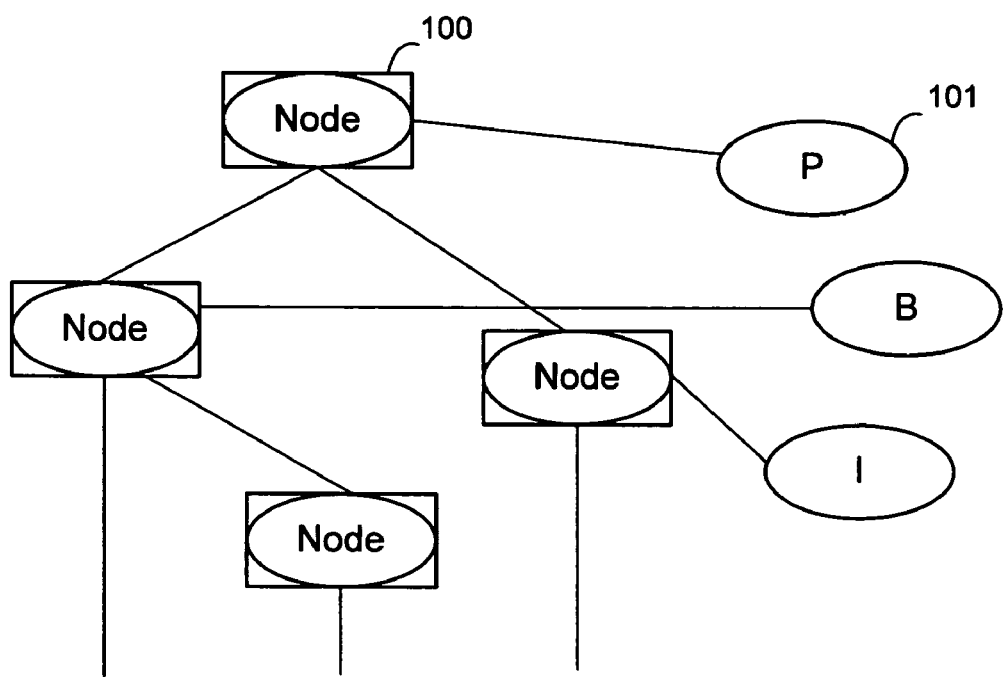
FIG. 1 is a diagram depicting tokens of a mark-up language parse tree in the prior art.

As HTML elements are parsed in, or created through DHTML, a markup tree is created as shown in FIG. 1. The mark-up tree represents the nesting and scope of the elements through Nodes. Each Node 100 points back to the element 101 that it is representing. Each Node has exactly one element, but each element may have several nodes representing it.

Figure 2:
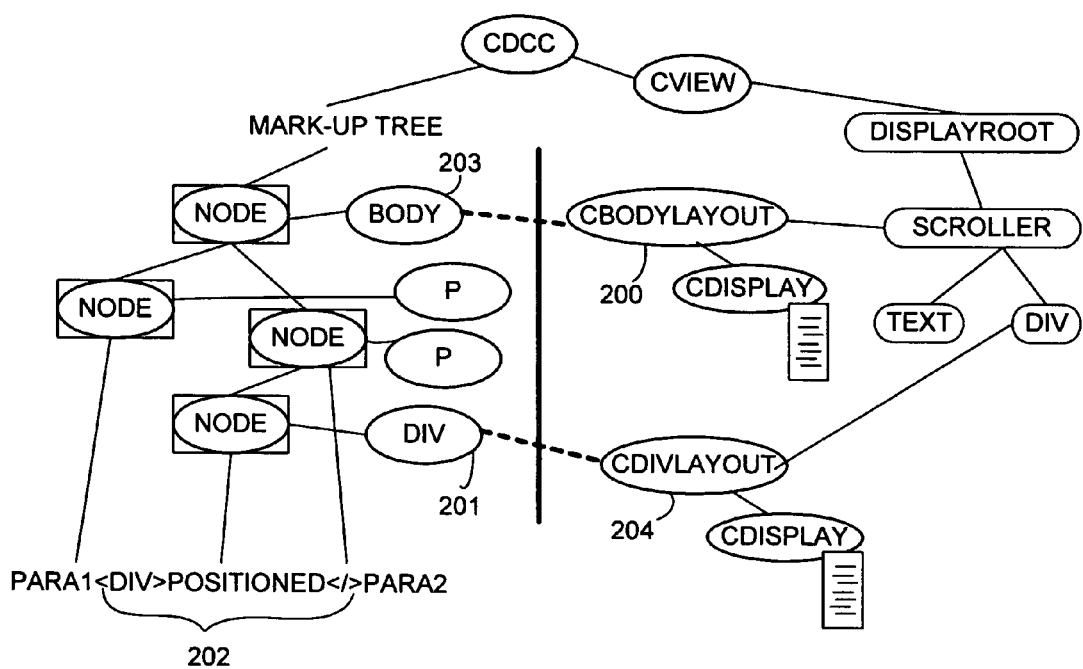
FIG. 2 is a diagram depicting the prior art mark-up tree with accompanying layouts.

Broadly then, any element that owns a region of the view of the content document needs to have specific information and functionality to flow itself and it's contents into that region. Generally, an element needs a layout object if it has rectangular (height and width) dimensions. An element may not necessarily be sized at the requested dimensions, but elements with such rectangular dimensions typically are assigned a layout object. Obviously, HTML elements like images, inputs, selects, and marquees have an extent which they own and for which they will always need this layout functionality. In FIG. 2, this specific information and functionality is encapsulated in the CLayout class 200 and the element with layout 201 that owns a physical region is known as the layout parent for the scoped tags 202 that will layout and render there.

Elements need layout, meaning that they need an instance of the CLayout derived object, if they have a "fixed" size or if they are responsible for sizing and positioning their content and children into a region of a view. The CLayouts define their own hierarchy within the structure of the markup tree. A layout parent (the layout responsible for sizing and positioning an element), may not necessarily be the element's parent.

As illustrated in FIG. 2, a layout object 200 is associated with an element 203 and maintains all the information about how that element measures and lays out in its region. In FIG. 2, this prior art model assigns a single layout object for each element that owns a region of the view. This works well in the prior art bottomless-page model, but when the multiple container model of the illustrated embodiment is introduced, elements often traverse two or more containers and may have a different geometry in each container. Therefore, in the illustrated embodiment, an element that owns a region of the view has a layout for every container in which it resides.

The Illustrated Embodiment

Figure 5:
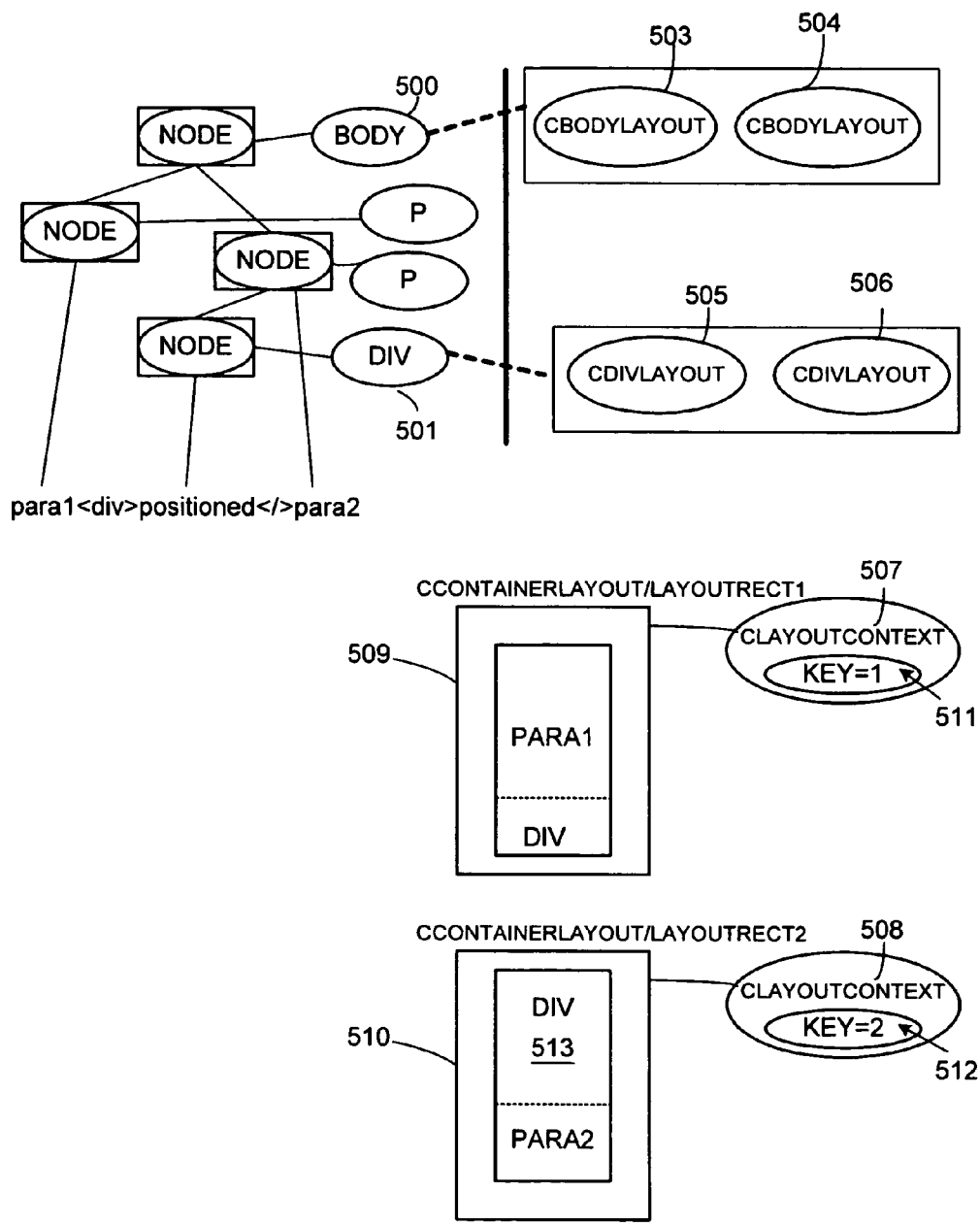
FIG. 5 is a block diagram defining the multiple layouts in multiple contexts.

Since a layout then defines the region that an element flows through, the invention defines multiple layouts for an element whenever that element flows through multiple containers. In FIG. 5 for example, the Body 500 element of the content document will have multiple CBodyLayouts 503–504 instantiated for it. One CBodyLayout for each container that the Body element flows through 509–510. In order to remove any ambiguity about which CLayout object (503 or 504) is associated with which container (509 or 510), each CContainerLayout 509 defines a CLayoutContext 507. The CLayoutContext is then used as a key (511 or 512) to the list of CLayouts 503–506. Once this mapping is set up the rest of the layout process happens normally.

Objects Overview

Figure 3:
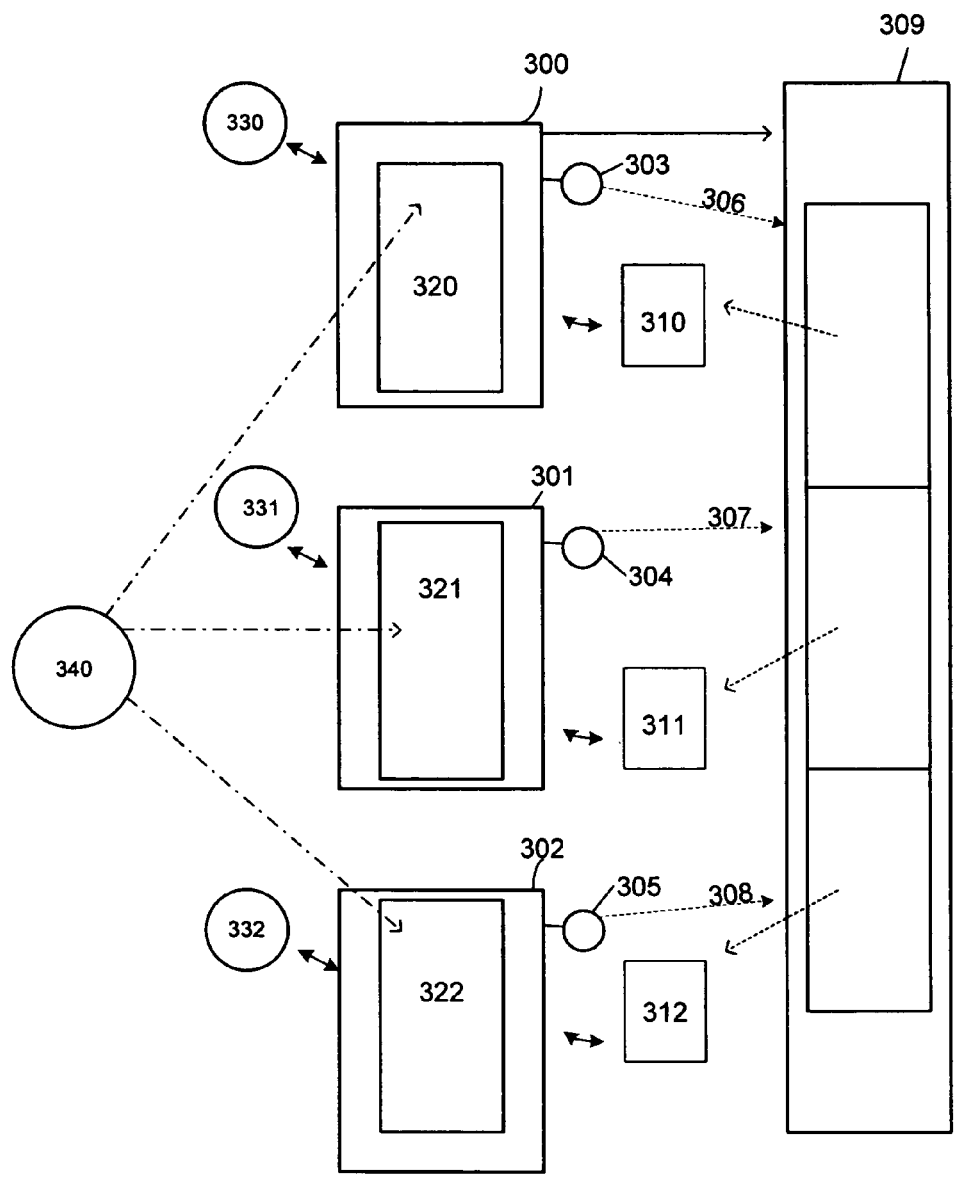
FIG. 3 is a block diagram of the object model.

The illustrated Object Model shown in FIG. 3 is brought into being when the <ie:LayoutRect> behavioral tag 401 in FIG. 4 is encountered in the View Template. The View Template defines a series of LayoutRect(s) 420–425 that the content document will flow through. Upon encountering each LayoutRect behavioral tag, the MSHTML engine instantiates a CContainerLayout object which holds the geometries for the area defined by that LayoutRect 426–428. In this example, the series of LayoutRects are homogeneous in dimensions as defined by the class mRect 426, but nothing prevents each LayoutRect from having a varied size and containing that varied size in the LayoutRect definition as follows:

```
<IE:LayoutRect
    contentSrc="www.microsoft.com/ ... "
    id=Rect1 nextRect=Rect2
    style="border:solid 2px red; height 50px; width 50px;
        margin 10px;
        top:100px; left:10px;"
/>
<IE:LayoutRect
    id=Rect2
    style="border:solid 3px blue; height 100; width 100;
        margin 10; top:170px; left:10px;"
/>
```

As shown in FIG. 3, for each CContainerLayout 300–302, a CLayoutContext object is instantiated 303–305, which is used to distinguish between CContainerLayouts 300–302. Further, when the first CContainerLayout is instantiated 300, it insfantiates a CViewChain 309. The CViewChain contains break information about the elements in each container that flow across container boundaries 310–312, and the CLayoutContext index 306–308, is used to access this information. The CLayoutContext object index keys are ordered in the CviewChain in the order of the CContainerLayouts they represent 303–305.

The CViewChain maintains a three dimensional array of Break Objects 313–315, which stores information about any content element in scope when the CContainerLayout fills up. A set of Pagination Algorithms populate the data in the Break Objects 310–312, and determine how content elements will divide their content across multiple CContainerLayout objects.

Objects Defined

CContainerLayout

As shown in FIG. 4 of the illustrated embodiment, each CContainerLayout is implemented through an element behavior tag that a View Template author places on the page. That element behavior tag is <IE:LayoutRect> 401, and it includes several defined attributes. The contentSrc attribute 402, is the content document (or content element) that will flow into the container. This contentSrc can be located anywhere—like the local hard drive, a LAN, a WAN, or on the world wide web. The nextRect 403 is the next container in the View Chain that the contentSrc should flow into after this one is filled.

From the perspective of an HTML template author, a chain of LayoutRects is composed of a first LayoutRect tag and a chain of zero or more following LayoutRect tags 420–425. Each LayoutRect tag contains attributes that specify the physical location and dimensions 426–428 of the space offered by that LayoutRect to accept elements from the content source document.

A LayoutRect is a rectangle area with a specific physical location and corresponding dimensions defined by a template author. In FIGS. 6–7, the HTML source document 600–700 selected by the template author (as identified by the contentSrc attribute of the LayoutRect) is flowed into the rectangle area defined in FIG. 4 as mRect0 404. Once this area is filled, the overflow of the content document is flowed into the next LayoutRect in the chain (421). If the next LayoutRect tag has not been parsed in yet (since parsing and layout in MSHTML are asynchronous and may occur simultaneously), layout of the content document is suspended, and the MSHTML engine continues to parse the View Template document. When the MSHTML engine subsequently encounters a next LayoutRect tag 405 in the View Template 400, if that LayoutRect is the nextRect expected ("nextRect" in 403 is the same as the "id" in 406) in the chain 420–425 for that source document 402, then the rectangle area defined by the nextRect LayoutRect 421 is filled with the source document overflow.

In the illustrated View Template, from the perspective of the underlying Object Model architecture, when the HTML engine parses in the <IE:LayoutRect> behavioral tag it detects the IHTMLLayoutRect interface and creates a special kind of CLayout derived layout object. That derived object is called CContainerLayout. The HTML engine parses in that LayoutRect's physical location and dimension attributes and instantiates a CContainerLayout object to hold that information. In FIG. 3, the HTML content document's 340 content elements are flowed into the area defined in the LayoutRects 330–332, such defined area dimensions now being represented in the CContainerLayouts 300–302.

For each such content element that owns a portion of the view in the area defined by the CContainerLayout, a CLayout object is instantiated. These CLayout objects 320–322 contain the information they need to flow their content elements into the CContainerLayout where they reside. CLayouts have access to the CalcSize method. The CalcSize method knows what kind of content element a CLayout is rendering and enables the CLayout to render its content element. The CLayout also contains methods that create the Break Objects 310–312 that populate the CViewChain. However, if a Clayout is able to completely flow its content element into the CContainerLayout where it resides, no Break Object will be placed in the CViewChain by that Clayout. A Clayout 320 only places a Break Object in the CViewChain 309, if the content element it is rendering is still in scope when a CContainerLayout becomes full.

Since a CContainerLayout may contain several content elements that are in scope when the CContainerLayout becomes full, the geometries of the CLayouts in scope are assembled by break record 310–312 and made available from the CViewChain 309, by using the CLayoutContext 303 index 306 for the particular CContainerLayout 300.

The CContainerLayout objects 300–302 contain logic to manage the size of the container's region as defined within the LayoutRect tag, as well as logic to defer measurement operations to CLayouts 320–322 instantiated for the HTML content document elements. The CContainerLayout essentially has four responsibilities:

1. Each CContainerLayout 301 defines a CLayoutContext 304 to identify its view.
2. Each CContainerLayout ensures that content in its view gets re-measured. Essentially, any CalcSize on the CContainerLayout first ensures all previous container layouts on the view chain have measured their content, and then measures the body layout in its context. If content is resized or changed (due to some event like margin changes, window size change, paper size) the CContainerLayout where the event occurred plus all subsequent containers in the chain must be resized.
3. The first CContainerLayout 300 in a chain owns the CViewChain 309, and is responsible for its allocation and deletion. The CViewChain is the only object to actually have the entire view-linked container order along with the accompanying break objects assembled by break record 310–312, and the first CContainerLayout 300 provides this view-linked content to other CContainerLayouts through the CViewChain 309.
4. Further, the CContainerLayouts implement the SetViewChain function to insert LayoutRects into the view-chain order.

CLayout

In FIG. 5, for each HTML element that owns a region of the view 500–501 within a CContainerLayout's boundaries 509–510, a CLayout object is instantiated 503–506. A CLayout object 506 flows its content element 513 into the container 510 where it lives. The CLayout contains geometries for the content element such as height, width, and position of the view, size of window for scroll bars, and etc. The CLayout is given its present position in the container when it is created to render it's element. For example, the CBodyLayout 503 gives the CDivLayout 505 it's position when it creates the CDivLayout 505 to flow its content. The CBodyLayout contains the geometries for that portion of the Boby element 500 which contains paragraph 1 in CContainerLayout/LayoutRect1 509. Further, CBodyLayout 504 defines that portion of the Body element 500 which contains paragraph 2 in CContainerLayout/LayoutRect2 510. Notice that each element that owns a region of the view 500–501, will have a separate CLayout object instantiated for it in each CContainerLayout that contains any portion of the element. In this case since both the Div element 501, and the Body element 500 own a portion of the view in both containers 509–510, they each need a separate CLayout for each container 503–506.

The Div element is in scope when CContainerLayout/LayoutRect1 509 is filled. So the CLayout for the DIV content element will place a break object in the CViewChain that is accessible by using the context key 511 for the CLayoutContext 507 for the container 509. Also notice that the Body element is in scope when CContainerLayout/LayoutRect1 is filled. A content element (BODY, DIV, SPAN, TABLE) is in scope if it has content left to render when the present container is filled. In this case, the CLayouts for both the Body and the Div would place a break object in the CViewChain.

Further, some HTML content elements are heirarchical in nature. In that case, each element within the larger element will have its own CLayout object. For example, a table has the table element <TABLE> and within the table element exists the table row element <TR> and table cell element <TD>.

Since each of these elements own a region of the view within a CContainerLayout, they each have a CLayout object. Further, if a break between containers happens in the middle of a table, the CLayouts for all three elements (<TABLE>, <TR>, and <TD>), would place a break object in the CViewChain. To make life simpler, a special break object called a CTableLayoutBreak groups information about tables in the CViewChain.

If a content element that owns a portion of the view, traverses multiple containers (a body often traverses them all), a separate CLayout is instantiated for each container. In that case, the CLayout for each container would place a break object in the CViewChain for that content element.

This information in a break object is designed to tell the CLayout in the next container for an element that traverses two containers, where to begin rendering itself, based on where the break left off in the prior context. CLayouts use the CLayoutContext index of the prior container to access the break information they need.

CLayoutContext

In FIG. 5 of the illustrated embodiment, the CLayoutContext object 507 is used to match the multiple CLayouts 503–504 in the content document to a particular CContainerLayout and LayoutRect 509. For example, in FIG. 3, the HTML content document content 320 that are flowed into the first CContainerLayout 300 and remain in scope when the container fills up, have break information described in the CViewChain 309. These dimensions are accessed by using the CLayoutContext 303 associated with the first container 300 as a key 306, to the CViewChain 309. The break objects placed in the CViewChain by the CLayouts can then be accessed by using the CLayoutContext key assigned to each container. Each CContainerLayout 300–302, has a corresponding break record 310–312 that is stored in an array on the CViewChain 309.

The CLayoutContext 303–305 provides access to the CViewChain 306–308 to identify the order of containers of content document flow 303–305, and provides access to the three dimensional array of break objects which is used by the CContainerLayout and CLayouts to determine where content elements in the previous container quit rendering. The purpose of the CLayoutContext is to identify and aid CLayouts in the creation of a content element's view within a specific CContainerLayout. Further, the CLayoutContext is used by CContainerLayouts to distinguish between one another.

CLayoutRectRegistry

Figure 8:
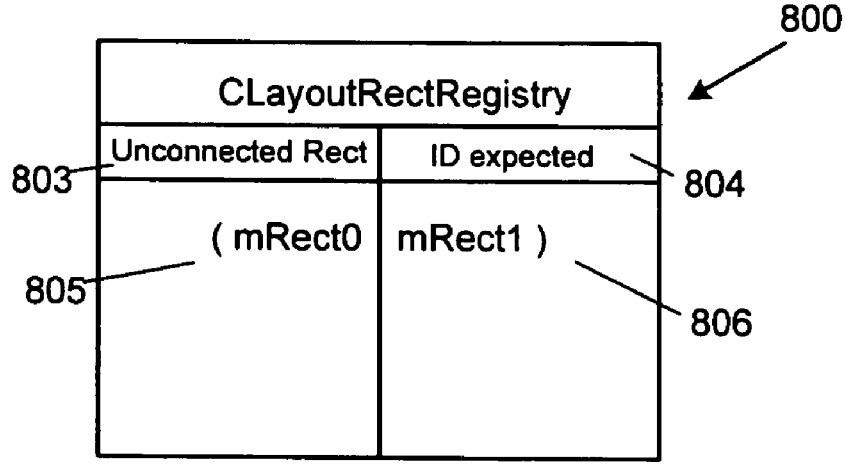
FIG. 8 is a block diagram of a CLayoutRectRegistry.

In FIG. 8 of the illustrated View Template, the CLayoutRectRegistry 800 is an object that matches the nextRect 801 attribute of a former LayoutRect, with the id attribute of the next LayoutRect 802 in the chain. It maintains an unordered list of tuples (Unconnected Rect 803, ID upon which it is waiting 804). In the tuple (mRect0, mRect1), the first identification "mRect0" 805 is the present or prior LayoutRect "id" attribute, and the second identification "mRect1" 806 is the "nextRect" 801 attribute identified by mRect0 as the next LayoutRect in the view chain. A simple linear search (typically only one or two entries would simultaneously exist) can be conducted to find a LayoutRect waiting on a given ID. The CLayoutRectRegistry class lives on the View Template mark-up tree. The HTML engine will supportmultiple separate chains of LayoutRects within the same View Template. For example, in FIG. 10 a series of five rectangular container areas 1003 would result from a given authored view template. If these containers were defined as two separate series of containers, they could contain two separate content documents. In such a case, a series of areas defined in a View Template—LayoutRects 1, 3, and 5 of 1003, could contain a content document (or content element) flowed in from a URL on a server in Egypt, while the series of LayoutRects 2 and 4 1003 of the same View Template could contain a content document (or content element) flowed in from a URL on a server in England. Two or more content documents (or content elements) could be placed in a View Template so long as the LayoutRects uniquely specify the chain of LayoutRects for each contentSrc to flow through.

CViewChain

In FIG. 9, the illustrated CViewChain maintains what is effectively a three dimensional array of break objects called the Break Table that tracks the state information for every content element that was in scope when a container filled up with content. When a content element has not been completely rendered when a container fills up, that content element's CLayout object places a break object in the break table of the CViewChain. These break objects are grouped based on the CContainerLayout they were in when the break happened. The type of break object placed in the three dimensional array of break objects for any given element is determined by the type of information the CLayout in the next container will need to continue flowing the content element that the break object represents. The break object for each content element that is in scope when a container boundary is crossed can found in the break table (three dimensional array) by using the unique CLayoutContext key assigned to the container where the break occurred.

The CViewChain maintains information about the series of linked containers. It is the only object that fully understands the continuity between the linked layout containers and their context identifiers, and performs all the related functions. Specifically, those responsibilities include:

1. The CViewChain maintains an ordered list of the CLayoutContexts pertaining to a chain of CContainerLayout/IE:LayoutRects.
2. The CViewChain exposes operations on the chain like allowing a context to ensure that all previous contexts are up to date.
3. Access to CViewChain is provided through the first CContainerLayout. The CViewChain provides access to the chain content.
4. The CViewChain provides methods to set and maintain breaking information for content elements in each context. The information that can be set/obtained includes available height and stitched coordinate offset for a context; plus the type of break whether the context or content ended at this break). These methods are delegated to a member object called the CRectBreakTable.
5. The CViewChain contains information (a task queue) to handle breaking of positioned elements on pages other than that which they started. This object gets the responsibility, because it is the only object that understands the full view-link.

The Break Table

The illustrated Break Table is an object living in the CViewChain that holds the break objects placed by the CLayout for any content element that remained in scope when a container was filled with content. This is effectively implemented as a three dimensional array of break objects. In FIG. 9, one dimension is the linked contexts identifying each layout view 900–901, and the second dimension 902–903, is the individual content elements that remained in scope when a container filled up with content.

The third dimension is depicted in FIG. 9 as two separate layers. The first layer is for in-flow content layout break objects 904, the second layer is for positioned ("display") content layout break objects 905. The distinction between in-flow content layout break objects and positioned display content layout break objects will be explored later in the "Pagination Algorithms" section. These break objects contain the information that their next CLayout in their next container will need to render them. All layout breaking objects are derived from CBreakBase. The inheritance hierarchy is as follows:

1. CBreakBase: This is the most basic break class. The CBreakBase is essentially nothing more than a dirty state. A dirty state is simply a flag indicating what containers need to be re-measured because some event changed that containers dimensions or content or the dimensions or content of a container in the chain before it. This break signals that upon re-entering this container, the container needs to be re-measured. CBreakBase is also parent to both CLayoutBreak and CBreakTableBase.
  a. CBreakTableBase: This is the break table. In FIG. 9, it contains an array of CBreakBase objects with basic methods to access break entries either by context 900–901, or content 902–903.
    i. CBreakTable: This is essentially just two CBreakTableBase objects. In FIG. 9, one CBreakTableBase is used to hold in-flow content elements break objects 904, the other CBreakTableBase is used to hold positioned "display" element break objects 905.
  b. CLayoutBreak: This is the break objects. It is the class that contains information placed in the break table by the CLayout for the content element that remains in focus when the container fills up. This is the break object placed in the three dimensional array. When an element runs out of space on the current layout rectangle, it creates a special structure called a CLayoutBreak and fills it with information about the state of the layout at the point of break.
    i. CFlowLayoutBreak: This is the layout break for normal positioning overflow. It is discussed below under Normal Positioning Pagination.
    ii. CTableLayoutBreak: This is the layout break for a table element. Each table column and row contains a table cell which has height and width properties. The CTableLayoutBreak contains these column row relationships, margins, padding between cells, etc. Further, a table cell itself can contain another table. This creates the potential for nesting table breaks within table breaks.

In FIG. 9, the first CBreakTableBase is for in-flow content (the "layout" break table) 904. It's breaks occur as we layout the document due to an exhaustion of content.

The latter CBreakTableBase is for positioned elements 905. Imagine an element that is positioned such that it will appear three pages after its definition in the content document. Some mechanism needs to track the amount of space consumed in each context (breaks in "display" rather than content) and apply it toward the positioning. The "display" break layer accomplishes this. (This concept is further illuminated below in "Absolute and Relative Positioning Pagination.")

LayoutRect

The illustrated LayoutRect is the behavioral tag a template author uses to invoke the container-based model over the bottomless page-based model. The LayoutRect tag puts the Object Model in motion. The <ie:LayoutRect> tag exposes the following set of attributes to manage the linking of content in the view chain:

1. contentSrc: The contentSrc can hold any type of reference to a mark-up element or document. Because it is simply a reference to an HTML representation, there is no limit as to where that HTML mark-up exists. The contentSrc reference attribute tells the layout rect where to go to get content to flow into itself. The contentSrc attribute could take a URL, possibly with a URL bookmark fragment, which specifies where to obtain the HTML content document that will be flowed into the areas defined within the HTML View Template document. The contentSrc could be a pointer to a memory location containing a mark-up tree already in memory. This section and other sections in this specification discuss the HTML content document as though it must be a separate URL containing a separate whole mark-up document. However, this is not the case. The View Template embodiment can flow any content element (such as DIV, TABLE, IMAGE, or etc.) through a view template. So whenever URL, content documents, content elements, or contentSrc are mentioned in this specification, this shall be interpreted as being inclusive of flowing any element capable of being defined in a mark-up language from any location. For example, a contentSrc is not limited to an existing mark-up tree, a mark-up document, or a dynamically built mark-up element or document. Further, the content element flowed into the defined container areas of the View Template may be obtained from inside the view template itself, or from outside the view template using any form of referencing.

2. nextRect=#id—the nextRect attribute specifies the ID of the next <ie:LayoutRect> element in the link of chained containers for the flow.
   a. If the content coming from the contentSrc is larger than the extent of the <ie:LayoutRect> then the content is broken at the ie:LayoutRect boundary and passed to the next ie:LayoutRect as specified by the nextRect property.
   b. If the nextRect:#id does not point to an ie:LayoutRect, measuring and layout stop upon flowing of present container and the onlayoutcomplete event is fired with fOverflow set to TRUE.
   c. If the nextRect:#id can not be found in the view template document, then measuring and layout stop and the onlayoutcomplete event is fired, with fOverflow set to TRUE.
   d. If multiple ie:LayoutRect's have the same nextRect:#id, the first one in source order wins and the subsequent links fail.
   e. If a nextRect link fails then content that was not measured in the previous container is not available anywhere in the view.
   f. If nextRect links to an ie:LayoutRect that also has a contentSrc specified, then the new contentSrc is given priority, and the link fails. This would cause onlayoutcomplete to fire with the fOverflow set to TRUE.
3. contentDocument—returns the document object of the content. Because of security, this property is only available when the LayoutRect model is used for printing.
4. honor PageBreaks—Boolean Attribute. When set, the MSHTML engine measuring code will honor page breaks set in the content document for the scope of this ie:LayoutRect. If there are widow or orphan properties specified they will be honored. If it is an explicit break, then the MSHTML engine will line-break and container-break if appropriate. This break, will either cause the on Overflow event to fire because there is no container for the rest of the content, or it will automatically start the subsequent content in the next container. If this is not set, then the page-break is ignored by the measurer and treated as an unknown attribute. By default a ie:LayoutRect has a TRUE value for this attribute.
5. honor PageRules—Boolean Attribute. If this property is not set, the layout process proceeds normally. When this property is set, the layout process will stop and line/container break when it encounters an element coming into scope that has a set of @page rules specified for it. The template will then be notified by the firing of an OnPage event. By default a ie:LayoutRect has a TRUE value for this attribute.

The <ie:LayoutRect> tag also listens for a specific event fired by the Layout engine: 1. onlayoutcomplete—This event is fired asynchronously from the layout process. This event indicates that Layout process has finished filling the event.srcElement container and some action may be required. The event will be fired from layout process for one of two reasons. Either there is no more content and this is the last container in a link-chain; or else there is more content than will fit, and no nextRect can be found. By default, extra content will not be measured or flowed into a container. However, in another embiodiment, content that doesn't fit within the container series can be made available by placing a scroll bar on the last container. In such an alternative embodiment the scroll properties could be based upon an overflow value set in the style block of the LayoutRec style block. In such an alternative embodiment, if this property is not set (or set to auto) then the content is left unmeasured and treated as though the display attribute was none; or could default to a style set in a parent.

The following event object properties are defined for this event:
   a. srcElement—defines the container that an event is fired on.
   b. fOverflow—is a boolean property that is set to TRUE if there is more content to be flowed but there is no nextRect specified in the LayoutRect or none is found available. It is set to FALSE if the layout process has completed and there in no more content to be flowed. This allows the container manager to harvest any additional containers which are now empty.
   c. nextPage—is a string property that returns " ", "left", or "Right" depending on why a pagebreak happened. For normal overflow, the value is " ". If the break happened because of a CSS page-break rule this will indicate if it was a "left" or "right" rule. Because the MSHTML engine knows nothing about what the page is (there may be multiple breaks per page, as in the case of multiple columns), or what right or left mean; it is up to the print template that implements this logic to read this value and insert the appropriate blank pages.

Pagination Algorithms (Populating the BreakTable)

In this embodiment, pagination in the HTML engine can roughly be described as a process of document formatting where the target is defined as one or more discrete rectangular containers. In the MSHTML engine notation, each such rectangular container is called a LayoutRect.

Figure 10:
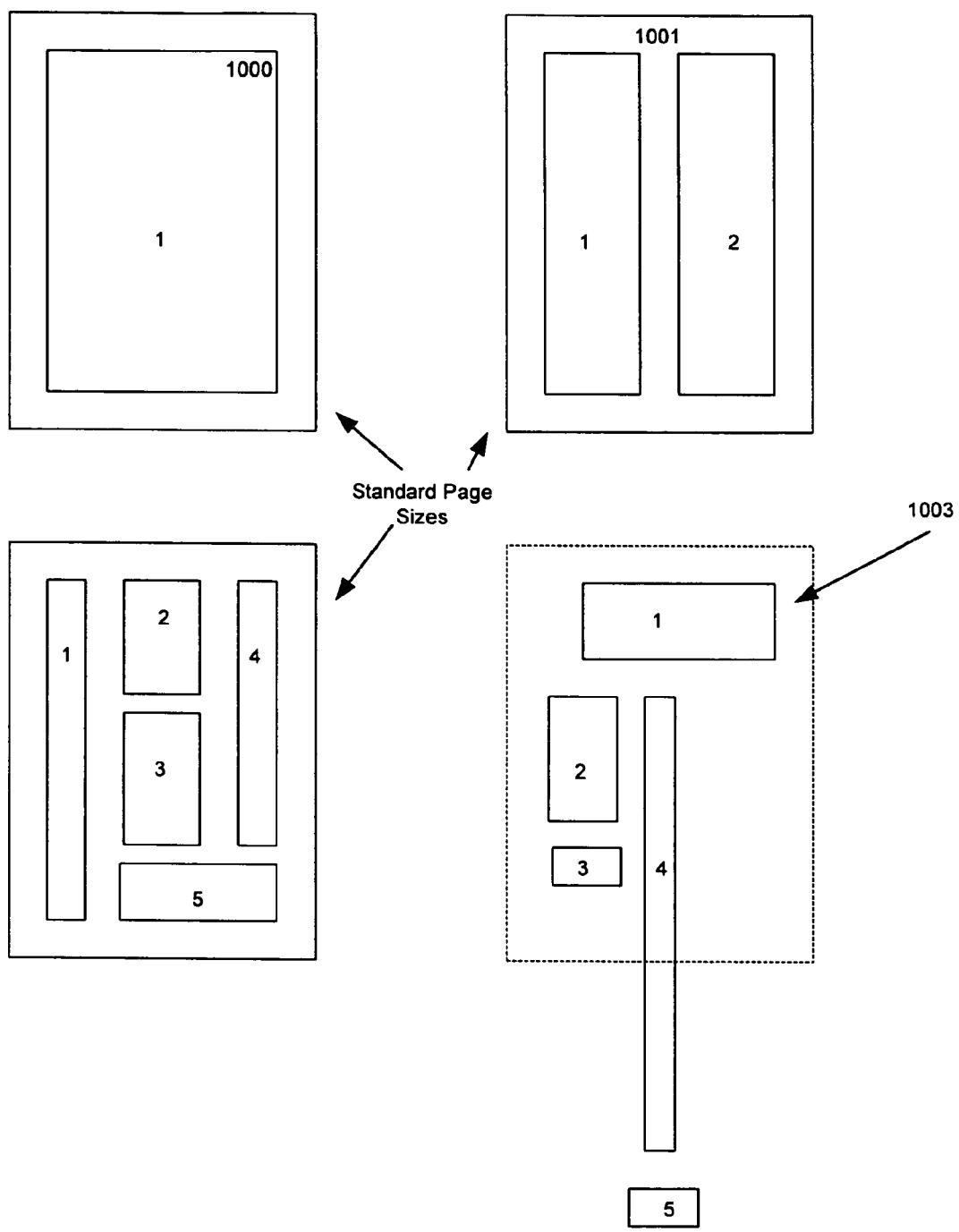
FIG. 10 is a block diagram showing a series of potential template layouts.

In simplest case the defined LayoutRects correspond to the dimensions of a printed page. In FIG. 10, if a LayoutRect dimensions are defined based on a standard page 1000, the HTML bottomless-page model is replaced with the simplest form of HTML view template document author controlled pagination. However, if the LayoutRects are drawn as two vertical columns per page 1001, two column pagination can be accomplished in HTML. However, the dimensions and placement of LayoutRects within a HTML view template document need not be designed with standard page sizes in mind 1003.

Rather, the term pagination has a broader meaning in that regard. Pagination means saving state information about the ongoing layout of the HTML content document between LayoutRects, so the layouts for the content elements will know where to resume the layout.

Under this definition, pagination defines the layout of the HTML content document not necessarily within standard pages, but within any series of LayoutRects defined by the HTML view template document author 1003. The placement and dimensions of the LayoutRects does not have to follow standard (or non-standard) page sizes.

The term pagination as it is used in this document can be defined as distribution of content between multiple pages or containers. In the default implementation, the content flows vertically from one page to another. However, the view template architecture is agnostic to flow direction and depending on the implementation of the content layout or view template automation, pagination can be vertical, horizontal, or both. Such an embodiment could facilitate and optimize a complex two-dimensional pagination model by adding another nextRect link for a second dimension, and by extending the view chain to explicitly handle two dimensions of layout containers.

Cascading Style Sheets (CSS) is a specification circulated by the World Wide Web Consortium (W3C) that allows authors of HTML content documents to attach style sheets to HTML documents. The CSS specification distinguishes three HTML content document positioning schemes. Those three positioning schemes are normal positioning, float positioning and absolute positioning. In order to support pagination of HTML content documents within the invention, these three positioning schemes are supported. The invention supports these three positioning schemes within the context of LayoutRects.

Normal Positioning

Normal positioning is the most common and probably natural way of representing content in the HTML world. In Normal Positioning, the document content is formatted starting at the top of containing block and content elements are laid out one after another. The content elements are flowed into the LayoutRect one after another. The formatted content may be described as consisting of lines of flow. If the content document contains text only, the formatted output will be an array of lines of text starting from the top and continuing down.

Many HTML content documents have more complex content that includes not only text, but images and other nested content elements. In this situation every nested content element forms either a whole line (block elements) or part of a line (inline elements). In either case, an array of lines for each element within the nesting is created.

Layouts consisting of lines are called flow layouts and they are represented by the CFlowLayout class or one of its derived classes. Pagination of flow layout is an iterative process where at each step the remaining available space within the LayoutRect is calculated to determine whether there is enough remaining space within the current LayoutRect to continue the flow layout. As soon as available space within a LayoutRect is consumed, the layout process within that LayoutRect should break.

Breaking implies saving all the necessary layout state information so that layout calculation can be resumed in the next LayoutRect. The layout calculation ends when the entire content document has been laid out, or there are no more layout containers to fill.

Normal Positioning flow pagination breaking has an important characteristic—a single document position can unambiguously define the break position. This statement is a direct consequence of the fact that for any given break position there is one and only one flow that breaks for that content element.

Float Positioned Elements

Floating positioned elements and table elements may introduce points where the flow breaks for more than one HTML element within the content document. This will require break information about more than one elements flow position in the break table.

A float layout is a box that a content document author can designate to be shifted to the left or right on the current line. When this float layout box is flowed into a LayoutRect, its float designation (left or right) is generally honored within the LayoutRect, assuming space available. An interesting characteristic of a float layout box is that its parent content may flow along its side. The parent's content element flows down the right side of a left-floated child element and down the left side of a right-floated child element. When Pagination is introduced into the HTML context, this nesting of elements requires additional consideration when populating the break tables.

If a LayoutRect becomes full at a point when the CLayout for a float layout box child element is being flowed with a parent element at it's left or right side, this creates a situation where more than one layout breaks. If such a break is encountered the CLayout for the child element, and the CLayout for the parent element each place a break object in the Break Table within that context. This information is needed by the CLayouts for both parent and child elements in order to resume layout calculation in the next container.

HTML table elements represent another situation where HTML pagination requires innovation. Tables have nested layouts that require a higher level of organization. HTML table elements consists of rows and columns of table cell elements. Each table cell element layout consists of a line array and is derived from CFlowLayout. If a HTML table element is being flowed at the time a LayoutRect overflows, several cells may be broken across the layout rectangle boundary.

Pagination of tables is based on normal positioning flow pagination, because the parent table element provides all the information about the available space in the current layout rectangle to each of it's cells. If during row calculation the layout of a table cell element breaks, the layout of their table element breaks. In that case, the break table will contain break information about the flow break for both the table element and each individual table cell element. Thus, the break table, will have the information needed (like row index) to resume layout on the next layout rectangle.

However, the table element layout may break sooner for other reasons. For instance, the next row may start below the layout rectangle boundary because of cell spacing. Further, if the table has a repeated header and/or footer row, the table pagination algorithm should handle repeating these rows for every layout rectangle containing the table.

Absolute Positioned Elements

An absolutely positioned HTML element is explicitly offset with respect to its parent containing block. The child absolutely positioned HTML element is removed from the normal positioning flow of it's parent containing block, so it does not affect later siblings. Further, the absolutely positioned child element establishes a new containing block to hold it's normal flow children and other positioned descendants. An absolutely positioned element may be thought of as a transparency with its contents printed there upon. The transparency is then moved to the explicitly defined offset within the parent containing block. In the bottom-less page model, the transparency is placed over the HTML document at the (x,y) coordinate which defines a set x and y distance form the (0,0) coordinate in the parent containing block. This (x,y) coordinate is called the explicit offset positioned request.

The normal positioned parent of the absolutely positioned child is like a sheet of paper that the transparency is laid upon. When the transparency is placed onto the sheet of paper at the explicitly defined offset, the combined layout will correspond to what MSHTML engine would produce in this situation.

Explicit offsetting of absolutely positioned elements adds to the complexity of LayoutRect pagination. For instance, the absolutely positioned element may be delayed until the end of the HTML content document, but may request an explicit offset at the beginning of the HTML content document. When this delayed description is imported into the containers defined in the HTML view template document, this delay must be considered.

In FIG. 4, when the HTML content document is brought in from the URL requested in the LayoutRect 402, it is parsed into a mark-up tree by the MSHTML engine. At that time, all requests for positioned elements (both absolutely and relatively positioned elements) are placed in a position queue. However, this explicit request represents the "continuous distance" in the bottomless-model. It does not include any adjustments for space between containers in the paginated model.

For example, if in the HTML content document, the author requested the explicit offset (100,100) for a logo overlay, that logo would be placed at (100,100) in the bottomless-page model. However, in the illustrated view template, the (100,100) offset would be calculated based not on the continuous distance from the parent container, but on the sum of the distances represented in the series of containers in the view chain. This distance is called the stitched coordinate offset.

The explicit request is placed in the position queue which is contained in the CViewChain. Upon entering each new CContainerLayout, the position queue is checked to see whether there are any requests made for explicit offsets that based on the stitched coordinate offset would fall within the existing container.

After in-flow layout for elements within a container has been completed, the absolutely positioned element with a request for that container are flowed into a separate layer "transparency" above the in-flow elements and placed over the container at explicit offset determined by the stitched coordinate offset. If any portion of the absolutely positioned element does not fit on top of the in flow container, that portion is clipped and placed back into the position queue, and a display break is placed in the break table.

As shown in FIG. 9, the break table contains a separate section that tracks display breaks 905. This area of the break table is called the display break layer. The display break portion of the break table tracks the state information for any "positioned" elements that break across container boundaries. (This concept is further illuminated below in "Absolute and Relative Positioning Pagination.")

Figure 11:
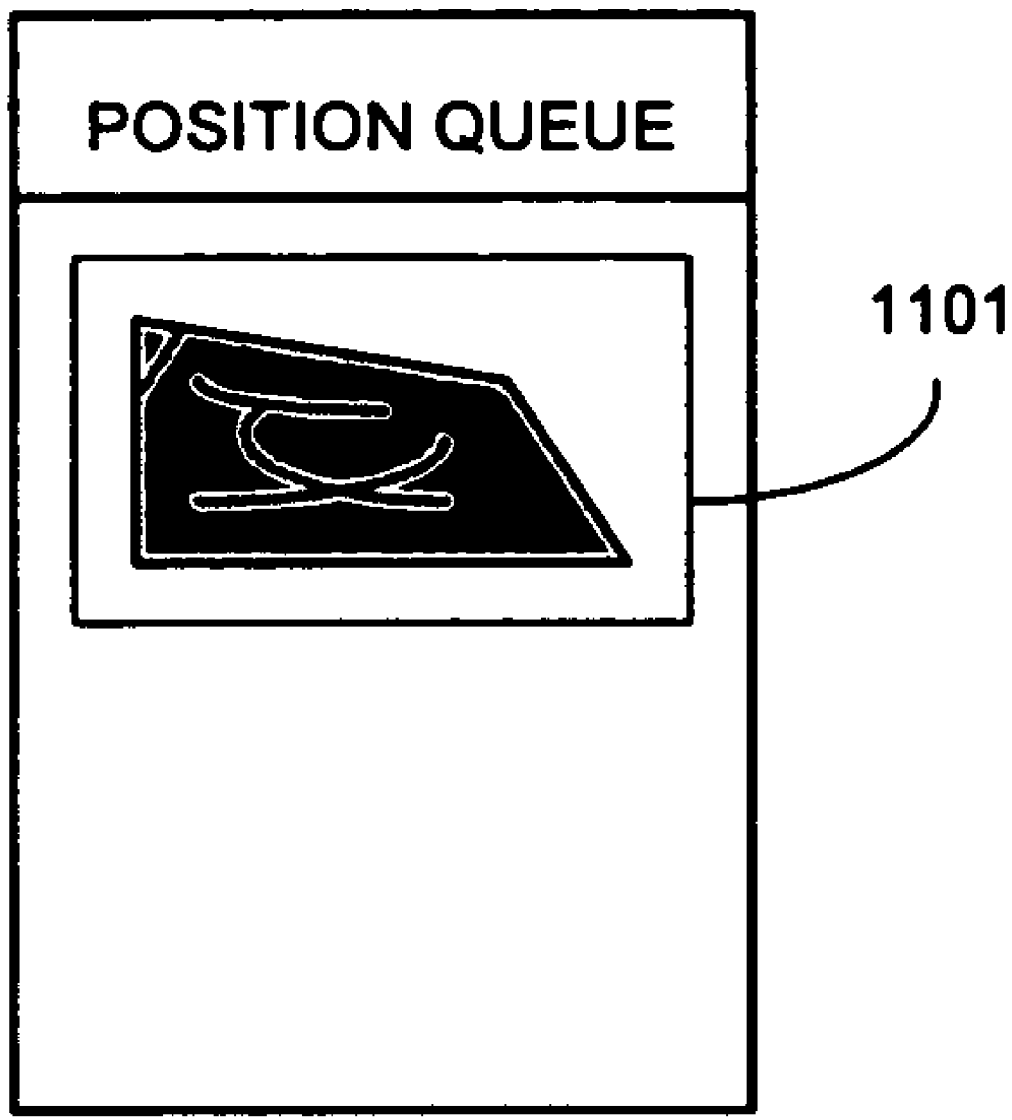
FIG. 11 is a block diagram of the position queue.

So the pagination of absolutely positioned elements is based on a poster-printing model. In this model, the absolutely positioned element's 905 layout is calculated as a whole piece like a transparency, and then placed onto the target layout rectangle at the explicit offset 921 determined from the running display break table. As shown in FIG. 11, if the "transparency" does not fit entirely onto the target LayoutRect, the left-over portion is duplicated and placed in the position queue 1101. When the next LayoutRect in the particular chain is encountered, the left-over portion will be taken from the position queue and laid onto the next LayoutRect.

Relative Positioned Elements

Though CSS does not explicitly recognize relative positioning as a separate positioning scheme, the invention paginates relatively positioned elements differently from absolutely positioned elements in some ways. A relative positioned element is positioned the same way as an absolutely positioned—the poster printing model discussed in the above paragraph. The difference between relatively and absolutley positioned elements is not in how they are positioned on top of the in-flow layer. The difference is in how the inflow layer reacts when the absolutely and relatively positioned elements are pulled out of the content document and placed into the transparency.

In one embodiment of the invention, if the block C is a relatively positioned element contained within the in-flow normal parent "ABCDE," pulling C out of in-flow normal parent would leave a hole where C was located-"AB DE." Then the resulting transparency when laid on top of "AB DE" would place C directly where it was relative to the parent creating "ABCDE."

However, in that embodiment, if the block C is an absolutely positioned element contained within the in-flow normal parent "ABCDE," pulling C out of inflow normal parent would not leave a hole where C was—"ABDE." Then the resulting transparency when laid on top of "ABDE" would place C directly wherever the offset is requested.

Implementation Infrastructure

Generally, a paginated document appears on several layout rectangles, and each element within that document that owns a region of the view is represented by a layout in every layout rectangle it appears. So a single element may be represented by one or more layouts.

A layout context is an identifier that distinguishes between these multiple layouts. Every layout rectangle defines its own unique layout context, and every layout appearing in that layout rectangle is defined as being in that layout rectangles layout context. So in FIG. 9, elements that remain in scope when a container is filled have break objects in the same context 916–919, and share the same layout context identifier 920.

CLayouts make a decision to break based on the available height remaining in the LayoutRect. This height information is passed through to the CLayouts as the "_cyAvail" member of CCalcInfo structure during calculation. Every CLayout should respect this value and stop calculation when this cyAvail limit is reached. Whenever a parent CLayout calls a child CLayout to calculate size, the parent updates _cyAvail by subtracting the height already consumed.

When an element runs out of available space on the current layout rectangle it creates a special structure called a layout break and fills it with information about the state of the layout at the point of the break. The content document position is always saved into the layout break as well as other information specific to the particular layout type that is breaking.

This same layout break information will be used to resume calculation on the next layout rectangle. However, the first layout rectangle starts calculation from the default state. There are several properties of layout break that are shared among all layout breaks, so they are defined in the base class CLayoutBreak:

1. Break Type: This indicates whether the layout ended because the content document overflowed the existing layout rectangle, or because the end of the content document was reached. These two possibilities are more particularly identified as follows:

_fLayoutBreakType=LAYOUT_BREAKTYPE_LINKEDOVERFLOW

_fLayoutBreakType=LAYOUT_BREAKTYPE_LAYOUTCOMPLETE

2. Overflow Type: If the layout ended because of overflow this property specifies the exact type of overflow. The enumerated possibilities are as follows:

_fOverflowType=LAYOUT_OVERFLOWTYPE_OVERFLOW (if ran out of available space);

_fOverflowType=LAYOUT_OVERFLOWTYPE_PAGEBREAKBEFORE (if CSS attribute page-break-before caused the break);

_fOverflowType=LAYOUT_OVERFLOWTYPE_PAGEBREAKAFTER (if CSS attribute page-break-after caused the break);

The layout breaks are saved in a special object called a break table. As shown in FIG. 9, the break table is a helper object providing functionality for saving and accessing layout breaks. The layout context 920 combined with a pointer to any given element in the context 922 unambiguously define every layout break in break table 918.

Normal Positioning Pagination

Normal positioning is managed by flow layout in the class CFlowLayout and its helper class CDisplay. CDisplay implements general line array calculation algorithms as well as pagination.

CFlowLayoutBreak is the corresponding layout break for normal positioning. It extends base class CLayoutBreak by adding the next members:

1. Flow Position: This contains the document flow position where calculations stopped. It is a pointer to CMarkupPointer held by "_pMarkupPointer."
2. Left and Right Margins: This contains values for the left and right margins that existed when the calculations stopped. These values are contained in "_xLeftMargin" and "_xRightMargin."
3. Left and Right Paddings. This contains values for the left and right paddings that existed when the calculations stopped. The values are contained in "_xLeftPadding" and "_xRightPadding."
4. Array of Float Sites: The array of float sites contains float sites broken at the break that need to be resumed. The float sites broken are of the type CArySiteTask and are contained in Member "_arySiteTask."

No layout break exists for the first layout in the element's layout chain, so normal positioning pagination starts in the first layout rectangle with all data initialized to default values. Thereafter, upon entering a new layout rectangle, the initializing states of layout and its helper classes is taken from information stored in the corresponding layout break. The current flow position is advanced to _pMarkupPointer, the current margin taken from _xLeftMargin and _xRightMargin, and the padding values are taken from _xLeftPadding and _xRightPadding.

Float sites that are registered in the float sites array are then calculated before any line on the layout rectangle. (See next section "Float Positioning Pagination.") Remember, Floating layouts do not add to the consumed space of their parent layout. Once the child floats listed in the floats sites array are calculated, the margins in the calling parent are updated so normal flow positioning pagination can begin.

The normal flow line array calculation then begins. After each line is measured a check for breaking conditions is made. The layout checks for the following break conditions (order is important):

1. CSS attribute page-break-before condition: The line has the corresponding flag set if the element starting on the line forces the CSS attribute page-break-before.
2. Overflow condition: First, the total consumed height is compared to available height, and then the layout checks the _fLayoutOverflow flag on the CCalcInfo structure. The _fLayoutOverflow flag is used by a child layout to notify a parent layout that it has overflowed. So either the check for available height by the parent, or the _fLayoutOverflow flag set by a child in the line may cause the parent to break due to overflow.
3. CSS attribute page-break-after condition: The line has the corresponding flag set if the element ending on the line forces the CSS attribute page-break-after.

If none of these breaking conditions occurs, the next line is calculated. Otherwise the layout finishes calculation, raises the _fLayoutOverflow flag, creates the layout break object, fills the layout break object with break information, and stores the break object in break table.

In order to handle the pagination of nested layouts, the consumed height is calculated and stored in the CCalcInfo member _yConsumed after each line is measured. This provides easy access to the data for call backs. When a parent CLayout instantiates a child CLayout to flow itself, the available height is updated for the child.

Float Positioning Pagination

The Float positioning pagination model is based on the general mechanism for handling float layouts in the MSHTML engine. As mentioned above under Normal Positioning Pagination, all float sites are calculated and aligned before the normal flow begins. Once the float sites are calculated, the parent aligns the float layout to the specified side. The parent then updates its own margins and then flows with respect to these new margins.

Pagination for float layout differs from nested case in several ways:

1. The float child layout does not affect parent breaking. If float child breaks it doesn't force the parent to break by setting set a flag in CCalcInfo. Instead it adds an entry to array of site tasks _arySiteTask in parent layout break structure.
2. The parent of float child processes all tasks in the site task's array before calculating its own layout. For every layout rectangle, the parent checks the site task array and processes all tasks before starting normal layout. After all tasks are completed, the margins included offsets for float layout boxes, so the parent has valid margin information to begin flow layout in the layout rectangle.

The entry in the site task's array is a pointer to a float element's tree node. So the site task's array may be described as a registry, that points to each float element's tree node, if the float element did not fit into the previous layout rectangle.

Table Element Pagination

HTML table elements are handled in a special way in order to support pagination. The problems arises that in the computation of a table layout, the size of each cell is calculated and laid out based upon it's relative relationship to other cells in the table and upon the entire space available for the table. When the table is measured in the bottomless-page model, the space available for the entire table is based on the single geometry of a single bottomless page. But, when the table is spread across two or more layout rectangles, the width or height available in two successive layout rectangles may vary. Thus, the table would have a tendency to spread out or reduce table column width or table column row in subsequent layout rectangles that have varied available space. A table with varied table column from one layout rectangle to the next would confuse the reader.

To solve this problem, the tables are calculated in their entirety as if they had an infinite width and height dimension, and this off-screen calculated table is saved in a "sketch board" geometry called a compatible layout context. This sketch board table is then used to help calculate table pagination, but it is never shown to the user. The compatible layout context for the table as a whole is calculated to determine relative restrictions like table width and column width. Then the compatible layout context may be used as a reference for all table layout characteristics in table layout in the subsequent layout rectangles. This also guarantees that during calculation, the table will not need to be recalculated from the beginning.

Basically a table consists of rows of cells. During pagination of the table, the table layout for that layout rectangle keeps track of the height already consumed and provides this information to each cell layout as the table layout progresses. As each cell layout progresses, it can set the overflow flag. The table layout will break if either a cell layout reports an overflow, or if the table layout runs out of space.

Absolute and Relative Positioning Pagination

As mentioned before, absolute and relative positioned elements are positioned based on the poster-printing model. The normal parent flow layout is calculated and then the positioned element layout whether absolute or relative is calculated.

If the positioned element is relatively positioned, when the normal flow parent was calculated it left white space under the spot where the relatively positioned element was expected to be placed based on its explicit offset.

In both relative and absolute postioning case, if the positioned element transparency does not fit entirely over the container determined by the stitched coordinate offset, the overflow is clipped and placed back on the position queue, and a display break is placed in the break table. This overflow causes a positioning request to be dealt with in the next container in the chain after in-flow contents have been completely flowed. The position request queue is managed in the CViewChain. This queue is given a chance to process every time a new layout rectangle is calculated.

If an element is a positioned element (whether absolute or relative positioned), the place that element is placed is determined based on a stitched coordinate system. The origin (0,0) of this stitched coordinate system is located at the top-left corner of the first layout rectangle in the chain. For any following layout rectangle it's left-top corner Y coordinate is calculated by adding heights of the layout rectangles preceding in the chain. The ongoing calculation of this stitched coordinate system 921 is maintained within the CViewChain for any given container as indexed through that containers context identifier. If at the moment of requests position queue processing, there is a layout rectangle containing the stitched coordinates on the request queue, the positioned element layout display node is inserted into the rectangle's display tree branch.

If the positioned element layout does not fit entirely into the target layout rectangle, a copy of the layout's display node or layout's display sub-tree in general case is created (this process is called display sub-tree cloning) and inserted into the next layout rectangle's display tree branch if available. By repeating the process of display sub-tree cloning and insertion until the layout is completed, a positioned element is paginated across multiple layout rectangles. Because of the properties of the stitched coordinate system a layout rectangle clips out the part of the content that extends beyond it's boundary, every subsequent layout rectangle will show the part of the positioned element starting where it ended on the previous layout rectangle and ending from where it started on the next layout rectangle.

Sample Run Through-Objects in Action

In the illustrated embodiment, here is an example of how two pages would be added to the view chain in a sample template:
1. The HTML engine encounters the behavioral tag LayoutRect, and "Rect1" is parsed in with a nextRect "Rect2."
   a. A CGenericElement is created for the IE:LayoutRect behavior, and a CContainerLayout is created and attached to the CGenericElement.
   b. The CContainerLayout creates a CLayoutContext.
   c. The CContainerLayout creates a CViewChain and adds its context to the empty chain.
   d. On the element's entertree, it checks the CLayoutRectRegsitry for a rect waiting on "Rect1" and finds none.
   e. Still on the entertree, it tries to find an element with another rect with a "Rect2" id. None is found, and it adds the tuple ("Rect1", "Rect2") to the layout rect registry.
2. The HTML engine loads the HTML content document as described in the contentSrc property of Rect1.
3. CalcSize comes in on the LayoutRect Rect1, and the calculation is delegated to the content CLayouts in this CLayoutContext (see specification beginning at Pagination Algorithms).
   a. Each content CLayout that remains in scope when its container is filled adds a break to the CViewChain, which creates and adds the necessary CBreakTable entries.
   b. Assuming the HTML content document has not been completely flowed in Rect1, at least the BODY layout has more content, and breaks with overflow
   c. onlayoutcomplete is fired on Rect1 with the fOverflow parameter set to true.
4. Script adds LayoutRect "Rect2" with a nextRect "Rect3"
   a. A CGenericElement is created for the IE:LayoutRect behavioral tag, and a CContainerLayout is created and attached to the CGenericElement.
   b. The CContainerLayout creates a CLayoutContext
   c. On the element's entertree, it checks the CLayoutRectRegistry for a rect waiting on "Rect2" and finds it.
      i. "Rect2" obtains the CViewChain from "Rect1"
      ii. "Rect2"'s CContainerLayout adds its CLayoutContext to the CViewChain after "Rect1"'s context.
      iii. The tuple ("Rect1", "Rect2") is deleted from the CLayoutRectRegistry.
   d. Still on the entertree, it tries to find another rect with a "Rect3" id and none is found, so it adds the tuple ("Rect2", "Rect3") to the CLayoutRecRegistry.

5. CalcSize comes in on the LayoutRect Rect2
   a. The CContainerLayout attached to Rect2 ensures that all previous contexts on the CViewChain are up to date (its checks for dirty states). The only previous context (corresponding to Rect1) is up to date.
   b. The calculation is delegated to the content CLayouts in this CLayoutContext.
   c. Each content CLayout uses the CLayoutContext to pick up its starting point from the CViewChain.
   d. Assume the BODY is out of content, so all layouts in this context end here.
   e. onlayoutcomplete is fired on Rect2 with the fOverflow parameter set to false.

View Templates

In the illustrated embodiment, the View Template author is not limited to designing the location of chains of containers to hold multiple content documents. At the View Template level, the View Template author has the full functionality of HTML and its related services. The View Template author can define additional content directly within the View Template itself. The content directly within the View Template along with the content flowed into the defined LayoutRect areas together represent the potential of the illustrated embodiment.

Exemplary Objects

With reference now to FIG. 12, in the illustrated embodiment, the object model has some portions that conform to the Component Object Model ("COM") of Microsoft Corporation's OLE and ActiveX specifications (i.e., is implemented as a "COM Object"), but alternatively may be implemented according to other object standards including the CORBA (Common Object Request Broker Architecture) specification of the Object Management Group. OLE's COM specification defines binary standards for components and their interfaces which facilitate the integration of software components. For a detailed discussion of OLE, see Kraig Brockschmidt, *Inside OLE, Second Edition*, Microsoft Press, Redmond, Wash., 1995.

By convention, the interfaces of a COM object are illustrated graphically as a plug-in jack 1200 in FIG. 12. Also, Interfaces conventionally are given names beginning with a capital "I." In accordance with COM, the server application component 86 can include multiple interfaces which are implemented with one or more virtual function tables. The member function of an interface is denoted as "IInterfaceName::FunctionName." Other portions of the object model are supported using C++ objects.

In the illustrated embodiment, when the HTML engine 1201 parses in a View Template document 1211 it creates a COM object 1202 as it would for any other HTML document. A C++ object is created for each CContainerLayout object 1203, and the first CContainerLayout component in each container series contains the content source to the HTML content document. Generally, a document COM object 1205 is created to hold the HTML content document 1204. A CViewChain C++ object 1206 is also created and made available through the first CContainerLayout object to the other CContainerLayout objects in the series. Finally, a CLayout C++ object 1207 is created to render each content element that owns a portion of the view within a container.

A View Template may flow more than one content document into the browser view. In that case, the second content document 1209 will be identified in the "contentSRC" in the first LayoutRect in the second series of containers. Each such content document will be represented by a separate COM object 1208. Further, multiple series of containers (id and nextRect) should be uniquely identifiable so members of container series are not confused in the CLayoutRectRegistry 1210. Finally each container series in the View Template, will be accessed through the same View Template component 1202 and the same CLayoutRectRegistry component 1210, but for each container series, a new set of the other objects are created to support the new series—CContainerLayouts, CLayouts, CViewChain, and content document.

Exemplary Operating Environment

Figure 13:
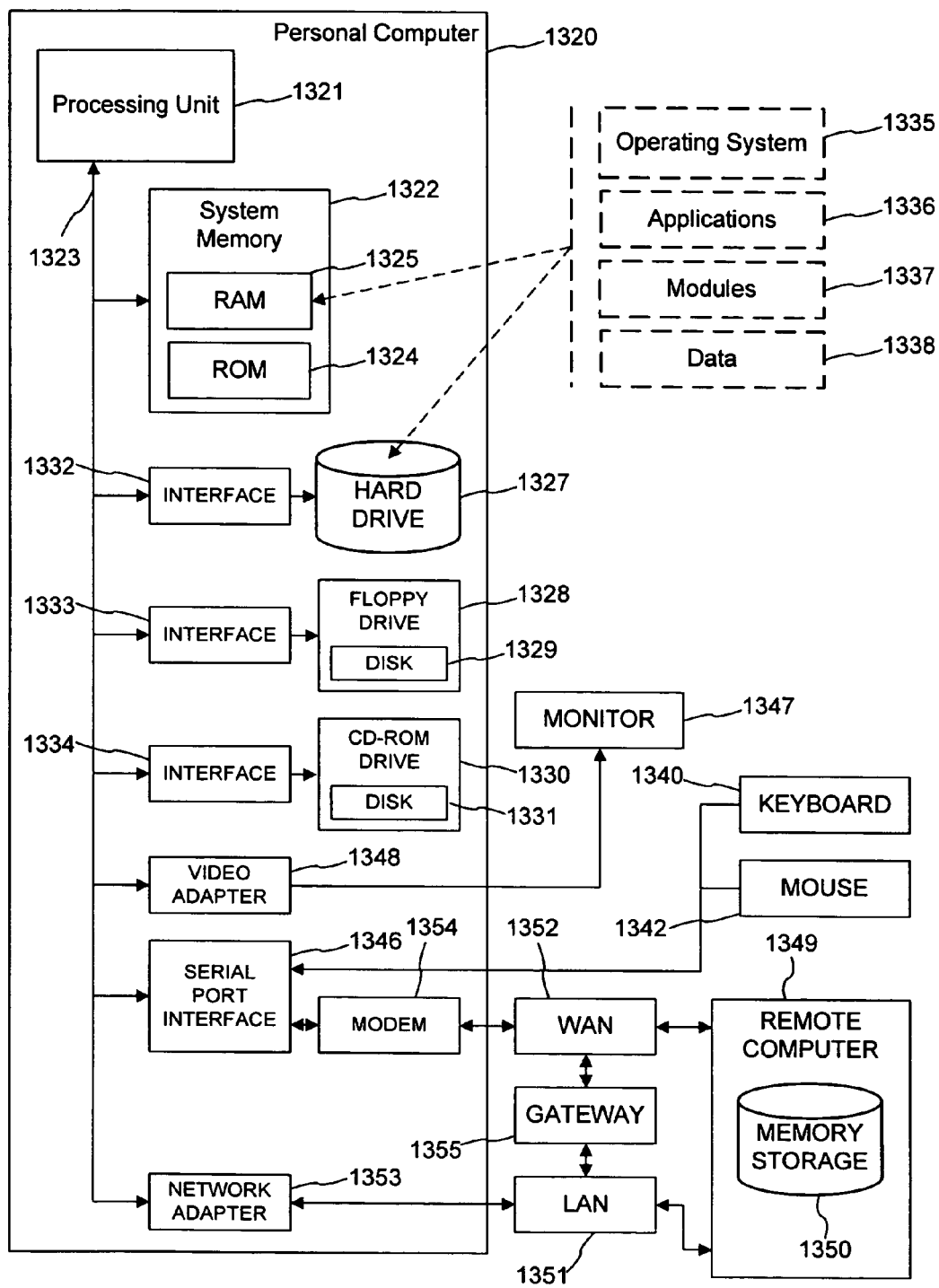
FIG. 13 is a block diagram of a distributed computer system that may be used to implement a method and apparatus embodying the invention for scalable, component based server applications.

FIG. 13 and the following discussion are intended to provide a brief, general description of a suitable computing environment in which the invention may be implemented. While the invention will be described in the general context of computer-executable instructions of a computer program that runs on a computer and/or computer printer, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including hand-held devices, multiprocessor systems, microprocessor-based or programmable consumer electronics, minicomputers, mainframe computers, and the like. The illustrated embodiments of the invention also can be practiced in networked computing environments, or on stand-alone computers.

Further, the illustrated embodiment of the invention may be practiced on all the following either alone or in a network environment (wireless or not): portable computing devices, electronic organizers, electronic day planners, electronic devices with screens, devices connected to screens, devices connected to printers, cell phones with miniature browsers, textual pagers, hand-held inventory devices, vehicles containing onboard devices with displays, or devices of any kind that render text or character for display or printing.

With reference to FIG. 13, an exemplary system for implementing the invention includes a conventional computer 1320 (such as personal computers, laptops, palmtops or handheld-PCs, set-tops, servers, mainframes, and other variety computers) includes a processing unit 1321, a system memory 1322, and a system bus 1323 that couples various system components including the system memory to the processing unit 1321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1321.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1324 and random access memory (RAM) 1325. A basic input/output system (BIOS), containing the basic routines that help to transfer information between elements within the computer 1320, such as during start-up, is stored in ROM 1324.

The computer 1320 further includes a hard disk drive 1327, a magnetic disk drive 1328, e.g., to read from or write to a removable disk 1329, and an optical disk drive 1330, e.g., for reading a CD-ROM disk 1331 or to read from or write to other optical media. The hard disk drive 1327, magnetic disk drive 1328, and optical disk drive 1330 are connected to the system bus 1323 by a hard disk drive interface 1332, a magnetic disk drive interface 1333, and an optical drive interface 1334, respectively. The drives and their associated computer-readable media provide nonvolatile storage of data, data structures, computer-executable instructions, etc. for the computer 1320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 1325, including an operating system 1335, one or more application programs 1336, other program modules 1337, and program data 1338.

A user may enter commands and information into the computer 1320 through a keyboard 1340 and pointing device, such as a mouse 1342. Other input devices (not shown) may include a microphone, joystick, game pad, satellite dish, scanner, or the like. These and other input devices are often connected to the processing unit 1321 through a serial port interface 1346 that is coupled to the system bus, but may be connected by other interfaces, such as a parallel port, game port or a universal serial bus (USB). A monitor 1347 or other type of display device is also connected to the system bus 1323 via an interface, such as a video adapter 1348. In addition to the monitor, computers typically include other peripheral output devices (not shown), such as speakers and printers.

The computer 1320 operates in a networked environment using logical connections to one or more remote computers, such as a remote computer 1349. The remote computer 1349 may be a server, a router, a peer device or other common network node, and typically includes many or all of the elements described relative to the computer 1320, although only a memory storage device 1350 has been illustrated. The logical connections depicted include a local area network (LAN) 1351 and a wide area network (WAN) 1352. Such networking environments are commonplace in offices, enterprise-wide computer networks, intranets and the Internet.

When used in a LAN networking environment, the computer 1320 is connected to the local network 1351 through a network interface or adapter 1353. When used in a WAN networking environment, the computer 1320 typically includes a modem 1354 or other means for establishing communications (e.g., via the LAN 1351 and a gateway or proxy server 1355) over the wide area network 1352, such as the Internet. The modem 1354, which may be internal or external, is connected to the system bus 1323 via the serial port interface 1346. In a networked environment, program modules depicted relative to the computer 1320, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 1320, unless indicated otherwise. Such acts and operations are sometimes referred to as being computer-executed. It will be appreciated that the acts and symbolically represented operations include the manipulation by the processing unit 1321 of electrical signals representing data bits which causes a resulting transformation or reduction of the electrical signal representation, and the maintenance of data bits at memory locations in the memory system (including the system memory 1322, hard drive 1327, floppy disks 1329, and CD-ROM 1331) to thereby reconfigure or otherwise alter the computer system's operation, as well as other processing of signals. The memory locations where data bits are maintained are physical locations that have particular electrical, magnetic, or optical properties corresponding to the data bits.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of printer or computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

Further, although illustrated as implemented in a computer printer, the invention can be practiced in other printing apparatus, such as copiers, fax machines, combined purpose printers, etc.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of displaying content documents in accordance with a custom layout on a computer having a display screen, an operating system operating under the control of a textual mark-up engine, and a textual mark-up template document, the method comprising:
   parsing in a first tag contained in the textual mark-up template document;
   determining from data defined by the first tag, a first textual mark-up content document, a first defined subset of the display screen area, and an identifier of a second tag;
   displaying content from the first textual mark-up content document in the first defined subset of the display screen area, and recording an association of the first tag with the second tag;
   parsing in a third tag contained in the textual mark-up template document;
   determining from data defined by the third tag, a second textual mark-up content document, a second defined subset of the display screen area, and an identifier of a fourth tag;
   displaying content from the second textual mark-up content document in the second defined subset of the display screen area, and recording an association of the third tag with the fourth tag;
   parsing in the second tag contained in the textual mark-up template document;

determining from a recorded association, that the second tag is associated with the first tag, and displaying overflow from the first textual mark-up content document in a display screen area defined by the second tag;

parsing in the fourth tag contained in the textual mark-up template document; and determining from a recorded association, that the fourth tag is associated with the third tag, and displaying overflow from the second textual mark-up content document, in a display screen area defined by the fourth tag.

2. In a computer network comprising a server system and a client system, a server-controlled method for generating a textual mark-up presentation document for presentation on an output device coupled to the client system, the method comprising:

receiving a request from the client system for the presentation document;

accessing a template document comprising plural layout tags that define plural content documents and defined areas within the presentation document the plural tags comprising, a first tag comprising data identifying a first content document, a first defined area within the presentation document, and an identifier of a first-next tag;

a second tag comprising data identifying a second content document, a second defined area within the presentation document, and an identifier of a second-next tag;

the first-next tag identifying a third defined area within the presentation document;

the second-next tag identifying a fourth defined area within the presentation document;

upon parsing in the template document, creating a record comprising associating the first tag with the first content document and the first-next tag, and associating the second tag with the second content document and the second-next tag;

creating the presentation document comprising, determining from associations in the record to place first content document overflow from the first defined area into the third defined area and to place second content document overflow from the second defined area into the fourth defined area; and sending the presentation document to the client system.

3. In a computer network comprising a server system and a client system, a client-controlled method for generating a textual mark-up presentation document for presentation on an output device coupled to the client system, the method comprising:

receiving a template document at the client system;

determining from a plural tags in the template document plural content documents including a network source for at least one content document and defined areas within the presentation document to flow the plural content documents, the plural tags comprising, a first tag comprising data identifying a first content document, a first defined area within the presentation document, and an identifier of a first-next tag;

a second tag comprising data identifying a second content document, a second defined area within the presentation document, and an identifier of a second-next tag;

the first-next tag identifying a third defined area within the presentation document;

the second-next tag identifying a fourth defined area within the presentation document;

upon parsing in the template document, creating a record comprising associating the first tag with the first content document and the first-next tag, and associating the second tag with the second content document and the second-next tag;

obtaining the at least one content document from the network source; and creating the presentation document comprising, determining from associations in the record to place first content document overflow from the first defined area into the third defined area and to place second content document overflow from the second defined area into the fourth defined area;

displaying the presentation document on the output device coupled to the client system.

4. A computer readable medium having computer readable code including a rendering engine and a template stored thereon said template defining a layout for content to occupy, the computer readable code comprising:

the template including plural textual mark-up tags comprising, a first tag defining a first container area, a first content source to occupy the first container area, and an identifier of a first container overflow tag indicating where to place content from the first content source that overflows the first container area, the first container overflow tag defining a second container area, a second tag defining a third container area, a second content source to occupy the third container area, and an identifier of a second container overflow tag indicating where to place content from the second content source that overflows the third container area, the second container overflow tag defining a fourth container area;

the rendering engine comprising computer executable instructions for, parsing the template and rendering a document according to the layout defined by the template, creating a record comprising overflow associations, and placing a first tuple associating the first container overflow tag with the first tag, parsing in the second tag and determining from the record that the second tag is not represented by tuples in the record comprising the first tuple, and placing in the record, a second tuple associating the second container overflow tag with the second tag, and parsing in the second overflow tag and determining from the second tuple in the record, to place content from the second content source that overflows the third container area into the fourth container area.

5. A method for customizing textual mark-up documents on a computer network using a textual mark-up content source, a textual mark-up customizing document containing a series of tags and a textual mark-up parsing engine, the method comprising:

parsing in a first tag in the textual mark-up customizing document, the first tag defining a container area and a first textual mark-up content source to be flowed into the defined container area, and the first tag further defining a second tag expected to be found in the customizing document, the second tag to receive an overflow of the first textual mark-up content source if that overflow would not fit within the container area defined by the first tag;

placing in a record a tuple, the tuple associating a unique first tag identifier with a unique second tag identifier;

parsing in the second tag in the textual mark-up customizing document, the second tag defining a container area;

determining from the tuple in the record based on associations of unique identifiers, that the overflow of the first textual mark-up content source defined in the first tag should be placed in the container area defined by the second tag;

before parsing in the second tag, parsing in a third tag in the textual mark-up customizing document, the third tag defining a container area and a second textual mark-up content source to be flowed into the container area defined by the third tag, and the third tag further defining a fourth tag expected to be found in the customizing document, the fourth tag to receive an overflow of the second textual mark-up content source if that overflow would not fit within the container area defined by the third tag;

determining from the record that the third tag is not related to the tuple associating the unique first tag identifier with the unique second tag identifier; and placing in the record a tuple, the tuple associating a unique third tag identifier with a unique fourth tag identifier.

6. The method of claim 5 wherein textual mark-up content defined in the textual mark-up customizing document is placed into areas in between the container areas defined the first, second, third and fourth tags.

7. The method of claim 5, further comprising:

parsing in an arbitrary tag and determining from the record whether the arbitrary tag is expected to receive textual mark-up content source overflow from a previous container area defined in a previous arbitrary tag based on whether the record associates the arbitrary tag unique identifier with the previous arbitrary tag unique identifier.

8. The method of claim 5 further comprising:

accessing remotely, content from the first textual mark-up content source;

accessing locally, other textual mark-up content; and flowing the other textual mark-up content outside the container areas defined by the first, second, third, and fourth tags.

9. The method of claim 5 wherein the first textual mark-up content source comprises content having both in-flow content elements and positioned content elements, and a record maintains a running total of the sum of the distances occupied by a series of containers defined by a series of related tags including the first tag, the second tag, and at least one other tag, the method comprising:

determining whether content from the first textual mark-up content source comprises an explicit offset request for placement of a positioned element at an explicit offset; and maintaining a running total of the sum of the distances occupied by the series of containers.

10. The method of claim 5 further comprising:

breaking a flow of the content from the first textual mark-up content source into the container area defined by the first tag upon a container full indication; and saving a break position where the flow stopped.

11. A computer system comprising:

a digital processor coupled to computer memory;

the computer memory comprising software including a textual mark-up template and a rendering engine;

the textual mark-up template comprising plural tags including, a first tag comprising data identifying a first content document, a first defined area within a presentation document, and an identifier of a next tag associated with the first tag, a second tag comprising data identifying a second content document, a second defined area within the presentation document, and an identifier of a next tag associated with the second tag, the next tag associated with the first tag comprising data defining a third defined area within the presentation document, the next tag associated with the second tag comprising data defining a fourth defined area within the presentation document; and the rendering engine comprising computer executable instructions for, parsing the textual mark-up template, creating records comprising a first record associating the first content document with the next tag associated with the first tag and a second record associating the second content document with the next tag associated with the second tag, rendering the presentation document comprising placing first content document overflow from the first defined area into the third defined area based on an association in the first record, and placing second content document overflow from the second defined area into the fourth defined area based on an association in the second record.

12. The computer system of claim 11 further comprising a display and wherein the presentation document is rendered on the display.

13. The computer system of claim 11 further comprising a network connection and wherein the computer system receives a request from a remote client computer over the network connection, and the computer system returns the presentation document in response to the request.

14. The computer system of claim 11 wherein the second content document is obtained from a remote source over a network connection.

15. In a computer system creating textual mark-up documents using a textual mark-up customizing document containing a series of tags and a textual mark-up parsing engine, the computer system comprising:

a means for parsing in a first tag in the textual mark-up customizing document, the first tag defining a container area and a first textual mark-up content source to be flowed into the defined container area, and the first tag further defining a second tag expected to be found in the customizing document, the second tag to receive an overflow of the first textual mark-up content source that does not fit within the container area defined by the first tag;

a means for placing a tuple in a record, the tuple associating the first tag with the second tag;

a means for parsing in the second tag in the textual mark-up customizing document, the second tag defining a container area;

a means for determining from associations of the tuple in the record, that the overflow of the first textual mark-up content source defined in the first tag should be placed in the container area defined by the second tag;

before parsing in the second tag, a means for parsing in a third tag in the textual mark-up customizing document, the third tag defining a container area and a second textual mark-up content source to be flowed into the container area defined by the third tag, and the third tag further defining a fourth tag expected to be found in the customizing document, the fourth tag to receive an overflow of the second textual mark-up content source that does not fit within the container area defined by the third tag;

a means for determining from the record that the third tag is not related to the tuple associating the first tag with the second tag; and a means for placing a tuple in the record, the tuple associating the third tag with the fourth tag.

16. The computer system of claim 15 wherein parsing is performed by a same means.

17. The computer system of claim 15 further comprising a means for determining whether a textual mark-up content source provides a positioning format comprising normal positioning, float positioning, or absolute positioning.

18. The computer system of claim 17 further comprising:
a means for determining that the textual mark-up content document comprises absolute positioning; and
a means for adjusting absolute positioning for distance between container areas.

19. The computer system of claim 15 further comprising a means for tracking display breaks in HTML elements that break across container areas.

20. The computer system of claim 15 further comprising a means for flowing a textual mark-up content document created in a bottomless page model into defined container areas.

21. A computer readable medium having computer executable instructions stored thereon for placing content substantially in conformance with a custom displayable layout, the computer including a textual mark-up engine and a textual mark-up template document describing the custom displayable layout, the executable instructions comprising:
instructions for parsing in a first tag contained in the textual mark-up template document;
instructions for determining from data defined by the first tag, a first textual mark-up content document, a first defined subset area of the custom displayable layout, and an identifier of a second tag;
instructions for placing content from the first textual mark-up content document in the first defined subset area of the custom displayable layout, and recording an association of the first tag with the second tag;
instructions for parsing in a third tag contained in the textual mark-up template document;
instructions for determining from data defined by the third tag, a second textual mark-up content document, a second defined subset area of the custom displayable layout, and an identifier of a fourth tag;
instructions for placing content from the second textual mark-up content document in the second defined subset area of the custom displayable layout, and recording an association of the third tag with the fourth tag;
instructions for parsing in the second tag contained in the textual mark-up template document;
instructions for determining from the recorded association, that the second tag is associated with the first tag, and placing overflow from the first textual mark-up content document in the custom displayable layout in an area defined by the second tag;
instructions for parsing in the fourth tag contained in the textual mark-up template document; and
instructions for determining from the recorded association, that the fourth tag is associated with the third tag, and placing overflow from the second textual mark-up content document, in the custom displayable layout in an area defined by the fourth tag.

22. The computer readable medium of claim 21 having computer executable instructions further comprising instructions for populating a break table with data recording how HTML elements break across defined subset areas of the custom displayable layout.

* * * * *

UNITED STATES PATENT AND TRADEMARK OFFICE
CERTIFICATE OF CORRECTION

PATENT NO. : 7,051,276 B1
APPLICATION NO. : 09/671815
DATED : May 23, 2006
INVENTOR(S) : Alex Mogilevsky et al.

It is certified that error appears in the above-identified patent and that said Letters Patent is hereby corrected as shown below:

On page 2, item (56), under "Other Publications", in column 1, line 4, delete "Guide" and insert -- Design --, therefor.

In column 3, line(s) 52–54, after "System" delete "that may be used to implement a method and apparatus embodying the invention for scalable, component based server applications." and insert -- implementing view templates for HTML documents. --, therefor.

In column 5, line 18, delete "insfantiates" and insert -- instantiates --, therefor.

In column 5, line 23, delete "CviewChain" and insert -- CViewChain --, therefor.

In column 7, line 14, delete "Boby" and insert -- Body --, therefor.

In column 7, line 36, delete "heirarchical" and insert -- hierarchical --, therefor.

In column 9, line 25, before "whether" insert -- ( --.

In column 12, line 7, delete "embiodiment" and insert -- embodiment --, therefor.

In column 12, line 11, delete "LayoutRec" and insert -- LayoutRect --, therefor.

In column 16, line 6, delete "absolutley" and insert -- absolutely --, therefor.

In column 16, line 47, delete "cyAvail" and insert -- _cyAvail --, therefor.

In column 19, line 41, delete "postioning" and insert -- positioning --, therefor.

In column 20, line 67, delete "CLayoutRecRegistry" and insert -- CLayoutRectRegistry --, therefor.

Signed and Sealed this

Twenty-seventh Day of July, 2010

David J. Kappos
*Director of the United States Patent and Trademark Office*